US012745873B2

(12) United States Patent
Incorvia et al.

(10) Patent No.: US 12,745,873 B2
(45) Date of Patent: Sep. 29, 2026

(54) FOOD CARTRIDGES AND CARRIERS FOR USE IN A COOKING DEVICE

(71) Applicant: Home Tech Innovation, Inc., Cambridge, MA (US)

(72) Inventors: Kevin Incorvia, Los Altos, CA (US); Robin Liss, Cambridge, MA (US); Heather Taft, Bedford, MA (US)

(73) Assignee: Home Tech Innovation, Inc., Cambridge, MA (US)

(*) Notice: Subject to any disclaimer, the term of this patent is extended or adjusted under 35 U.S.C. 154(b) by 0 days.

(21) Appl. No.: 16/739,832

(22) Filed: Jan. 10, 2020

(65) Prior Publication Data

US 2020/0390265 A1 Dec. 17, 2020

Related U.S. Application Data

(63) Continuation of application No. PCT/US2018/041819, filed on Jul. 12, 2018.

(Continued)

(51) Int. Cl.

*A47J 27/10* (2006.01)
*A23L 5/10* (2016.01)

(Continued)

(52) U.S. Cl.

CPC ................. *A47J 27/10* (2013.01); *A23L 5/13* (2016.08); *A47J 27/18* (2013.01); *A47J 36/00* (2013.01)

(58) Field of Classification Search

CPC ......... A23L 5/13; A23L 5/10; A23V 2002/00; A23V 2300/24; A47J 27/10; A47J 27/18;

(Continued)

(56) References Cited

U.S. PATENT DOCUMENTS

| | | | |
|---|---|---|---|
| 590,212 | A | 9/1897 | Daesch |
| 734,054 | A | 7/1903 | Frost |

(Continued)

FOREIGN PATENT DOCUMENTS

| | | | |
|---|---|---|---|
| CA | 2 904 544 | A1 | 9/2014 |
| CN | 2452942 | Y | 10/2001 |

(Continued)

OTHER PUBLICATIONS

Non-Final Office Action mailed Jul. 14, 2017 for U.S. Appl. No. 15/419,627, 11 pages.

(Continued)

*Primary Examiner* — Drew E Becker
(74) *Attorney, Agent, or Firm* — COOLEY LLP

(57) ABSTRACT

Systems, devices, and methods for storing and/or cooking food items via a food storage and cooking device are described. In some embodiments, a method of cooking a food item via includes disposing a food item in a food container, an inner volume of the food container configured to receive a flow of fluid and an outlet of the food container substantially aligned with a drain. A volume of fluid having a temperature sufficient to cook the food item is conveyed into the inner volume of the food container. After a predetermined time, a flow of fluid is conveyed into the inner volume of the food container such that the volume of fluid in the inner volume of the food container exceeds a threshold volume. The volume of fluid is then drained automatically into the drain in response to the volume of fluid exceeding the threshold volume.

6 Claims, 11 Drawing Sheets

Related U.S. Application Data

(60) Provisional application No. 62/531,412, filed on Jul. 12, 2017.

(51) Int. Cl.
*A47J 27/18* (2006.01)
*A47J 36/00* (2006.01)

(58) Field of Classification Search
CPC .. A47J 36/00; A47J 27/02; A47J 36/08; A47J 36/32; A47J 2027/006; A47J 27/21041; A47J 27/21083
See application file for complete search history.

(56) References Cited

U.S. PATENT DOCUMENTS 1,422,472 A * 7/1922 Penrod .................... A47J 39/00 126/20.1
2,055,490 A * 9/1936 Groeniger ............... E03D 11/18 4/421
2,071,790 A * 2/1937 Groeniger ............... E03D 11/08 4/425
2,097,478 A 11/1937 Struble
2,323,623 A 7/1943 Porter
2,504,794 A 4/1950 Berman et al.
2,734,836 A * 2/1956 Elian et al. .......... C13K 13/002 127/37
2,812,254 A 11/1957 Smith, Jr.
3,294,548 A 12/1966 Vischer, Jr.
3,353,476 A 11/1967 Goodman et al.
3,410,981 A 11/1968 Martin
3,432,642 A 3/1969 Lohr et al.
3,468,369 A 9/1969 Tetrick et al.
3,507,322 A 4/1970 Tetrick et al.
3,547,660 A 12/1970 Weisberg
3,552,566 A * 1/1971 Lowe ................... A23C 9/1427 210/114
3,608,770 A 9/1971 Vincent et al.
3,819,089 A 6/1974 Scales
3,835,762 A * 9/1974 Rambaud ................. A23B 2/30 99/516
3,850,331 A 11/1974 Oxel
3,888,303 A * 6/1975 Skala ...................... A47J 27/17 165/300
3,946,654 A 3/1976 Janssen
3,983,259 A 9/1976 Maior
4,010,736 A 3/1977 Sacomani et al.
4,013,798 A 3/1977 Goltsos
4,084,492 A 4/1978 Sullilvan
4,089,367 A 5/1978 Wietzel et al.
4,156,454 A * 5/1979 Skala ...................... F25D 17/02 99/332
4,173,993 A * 11/1979 Skala .................... F25D 31/005 126/400
4,188,794 A 2/1980 Skala
4,214,514 A 7/1980 Contino et al.
4,215,629 A 8/1980 Janssen
4,270,598 A 6/1981 Britton
4,505,192 A 3/1985 Dreano
4,646,628 A 3/1987 Lederman
4,817,512 A 4/1989 Vangen
4,955,361 A 9/1990 Sotani et al.
4,991,545 A * 2/1991 Rabe ....................... A47J 36/42 122/382
5,008,123 A 4/1991 Bewley et al.
5,086,693 A 2/1992 Tippmann et al.
5,094,865 A 3/1992 Levinson
5,097,759 A 3/1992 Vilgrain et al.
5,123,337 A 6/1992 Vilgrain et al.
5,168,712 A 12/1992 Coelho et al.
5,174,273 A 12/1992 Oiwa
5,174,274 A 12/1992 Oiwa
5,201,364 A 4/1993 Tippmann et al.
5,228,384 A 7/1993 Kolosowski
5,281,426 A 1/1994 Pardo
5,313,876 A * 5/1994 Hilger ...................... A47J 27/18 99/336
5,376,392 A 12/1994 Ikegami et al.
5,381,670 A 1/1995 Tippmann et al.
5,421,246 A 6/1995 Tippmann et al.
5,445,062 A 8/1995 Polster
5,542,344 A * 8/1996 Koether .................. A23L 3/375 99/333
5,552,172 A 9/1996 Liebermann
5,990,454 A 11/1999 Westerberg et al.
6,085,639 A * 7/2000 Dreano ................... A47J 27/18 62/282
6,162,478 A 12/2000 Koch
6,202,637 B1 3/2001 Roberts
6,244,165 B1 6/2001 Trombley et al.
6,262,396 B1 7/2001 Witt et al.
6,414,274 B1 7/2002 Mahyari
6,447,827 B1 * 9/2002 Andersen ................. A23B 4/07 426/511
6,570,136 B1 5/2003 Lockwood et al.
6,588,327 B2 7/2003 Wakabayashi et al.
6,818,869 B2 11/2004 Patti et al.
7,105,779 B2 9/2006 Shei
7,654,194 B2 * 2/2010 Lagares Corominas .................... A23L 3/001 99/402
7,757,601 B2 * 7/2010 Lagares Corominas .................... A23L 5/13 99/330
8,302,528 B2 11/2012 Pawlick et al.
8,455,028 B2 6/2013 Breunig et al.
9,055,756 B2 6/2015 Lambert
9,095,638 B2 8/2015 Solfa
9,226,609 B2 * 1/2016 Romero .................. A47J 27/18
9,285,280 B2 3/2016 Faden
9,439,530 B2 9/2016 Logan et al.
9,603,477 B2 3/2017 Hoare et al.
9,826,752 B2 11/2017 Cocchi et al.
10,440,979 B2 10/2019 Liss
10,627,790 B2 4/2020 Pinto et al.
10,760,794 B2 9/2020 Cheng
10,798,953 B2 10/2020 Liss
10,863,848 B2 12/2020 Pearson
10,976,097 B2 * 4/2021 Liss ........................ A47J 27/18
11,284,636 B2 3/2022 Liss et al.
11,533,937 B2 12/2022 Liss et al.
2003/0057206 A1 3/2003 Ishii et al.
2003/0178411 A1 9/2003 Manganiello et al.
2004/0094532 A1 5/2004 Li
2004/0121054 A1 6/2004 Berrier et al.
2005/0072315 A1 4/2005 Romero
2005/0258171 A1 11/2005 Witt
2006/0251784 A1 11/2006 Sells et al.
2007/0012068 A1 1/2007 Kaplan
2007/0181008 A1 8/2007 Pawlick et al.
2007/0261561 A1 11/2007 Grossbach et al.
2008/0069485 A1 3/2008 France et al.
2008/0121110 A1 5/2008 Lee
2008/0283440 A1 11/2008 Hartsfield, Jr. et al.
2009/0071345 A1 3/2009 Wolf
2009/0110791 A1 4/2009 Burley et al.
2010/0021605 A1 1/2010 Cadoret et al.
2010/0147159 A1 6/2010 Fossati
2010/0178402 A1 7/2010 Ippolito et al.
2010/0255168 A1 10/2010 Roth
2011/0030565 A1 2/2011 Shei
2011/0104349 A1 5/2011 Foser
2011/0117259 A1 * 5/2011 Storek ..................... A47J 36/00 99/330
2011/0195167 A1 8/2011 Sus et al.
2011/0252813 A1 10/2011 Veltrop
2012/0034354 A1 2/2012 Board et al.
2012/0137898 A1 6/2012 Alipour
2012/0251695 A1 10/2012 Neff et al.
2012/0298655 A1 11/2012 Kamii et al.
2012/0301585 A1 11/2012 Spirig
2013/0011537 A1 1/2013 Vahid

(56) References Cited

U.S. PATENT DOCUMENTS

2013/0101720 A1 4/2013 Allaire
2013/0129892 A1 5/2013 Cadoret et al.
2013/0224342 A1 8/2013 Peng
2013/0240500 A1 9/2013 Alipour et al.
2013/0264333 A1 10/2013 Alipour et al.
2014/0165611 A1 6/2014 Boarman et al.
2014/0165644 A1 6/2014 Veltrop
2014/0242232 A1 8/2014 McDonald
2014/0251164 A1* 9/2014 Alipour .................. A47J 27/10 99/483
2014/0260998 A1 9/2014 Pearson
2014/0322416 A1 10/2014 Sanseverino
2014/0322418 A1* 10/2014 Cowe ...................... A47J 27/10 426/523
2014/0348989 A1 11/2014 Sloat et al.
2015/0027319 A1 1/2015 Wu
2015/0064314 A1 3/2015 Manuel et al.
2015/0083110 A1* 3/2015 Shibuya .................. A47J 27/04 126/369
2015/0118362 A1 4/2015 Raczynski
2015/0173552 A1* 6/2015 Shibuya ................ A47J 36/027 219/731
2015/0201749 A1 7/2015 Turner et al.
2015/0257404 A1 9/2015 Isenberg et al.
2015/0257574 A1 9/2015 Hoare et al.
2015/0265090 A1* 9/2015 Pennella ................. A47J 27/10 426/232
2015/0272371 A1 10/2015 Gagnon
2015/0289544 A1 10/2015 Mendonca Vilela Pinto Ferreira et al.
2015/0313400 A1 11/2015 Hu
2016/0000250 A1* 1/2016 Abe .................... A47J 37/0664 99/403
2016/0046429 A1 2/2016 Bray
2016/0123660 A1 5/2016 Peng
2016/0150906 A1* 6/2016 Lee ....................... F24C 15/003 392/401
2016/0206136 A1 7/2016 Storek et al.
2016/0242594 A1 8/2016 Empl
2016/0278567 A1 9/2016 Gagnon
2016/0379434 A1 12/2016 Huang
2017/0016623 A1 1/2017 Rabie et al.
2017/0027365 A1 2/2017 Mendonca Vilela Pinto Ferreira et al.
2017/0036791 A1 2/2017 Infante
2017/0135383 A1 5/2017 Liss
2017/0190500 A1 7/2017 De Poly
2017/0238750 A1 8/2017 Liss et al.
2018/0058699 A1 3/2018 Hessenauer et al.
2018/0187963 A1 7/2018 Yin
2019/0045965 A1 2/2019 Liss et al.
2019/0086143 A1 3/2019 Liss et al.
2019/0104879 A1 4/2019 Howitt
2019/0110640 A1 4/2019 Te Velde et al.
2019/0374060 A1* 12/2019 Winterrose ............... A23L 5/13
2020/0029603 A1 1/2020 Liss
2021/0177197 A1 6/2021 Streeck et al.
2021/0195926 A1 7/2021 Liss et al.
2021/0227859 A1 7/2021 Liss
2022/0279956 A1 9/2022 Liss et al.
2023/0200414 A1 6/2023 Liss et al.

FOREIGN PATENT DOCUMENTS

CN 1649535 A 8/2005
CN 1726849 A 2/2006
CN 2866384 Y 2/2007
CN 1973738 A 6/2007
CN 2925325 Y 7/2007
CN 201119382 Y 9/2008
CN 101466606 A 6/2009
CN 101493233 A 7/2009
CN 201734493 U 2/2011
CN 102123636 A 7/2011
CN 102753894 A 10/2012
CN 102772148 A 11/2012
CN 203168914 U 9/2013
CN 203168928 U 9/2013
CN 203168929 U 9/2013
CN 203168930 U 9/2013
CN 203263115 U 11/2013
CN 203263116 U 11/2013
CN 203314782 U 12/2013
CN 302840062 6/2014
CN 104936485 A 9/2015
CN 204950635 U 1/2016
CN 204950636 U 1/2016
CN 104471315 A 10/2016
CN 103211519 B 12/2016
CN 106580053 A 4/2017
CN 206507810 U 9/2017
CN 108601377 A 9/2018
DE 2 211 659 9/1973
EP 1437547 A2 7/2004
EP 2 719 309 A1 4/2014
EP 2719309 B1 12/2014
FR 2 753 346 A1 3/1998
FR 2 978 957 2/2013
GB 622042 A 4/1949
JP H0463553 A 2/1992
JP H04279111 A 10/1992
JP H06153839 A 6/1994
JP H08502915 A 4/1996
JP H09313348 A 12/1997
JP H11503614 A 3/1999
JP 2000116515 A 4/2000
JP 2001-299313 A 10/2001
JP 2002017563 A 1/2002
JP 2004-278895 A 10/2004
JP 2005532144 A 10/2005
JP 2008504026 A 2/2008
JP 2012100820 A 5/2012
JP 5800403 B1 10/2015
JP 2016101216 A 6/2016
JP 2015-532145 A 11/2018
KR 20070031338 A 3/2007
KR 101100702 B1 12/2011
KR 10-2016-0063842 A 6/2016
RU 2159731 C1 11/2000
WO WO 1992/000018 A 1/1992
WO WO-2011111231 A1 9/2011
WO WO-2014019018 A1 2/2014
WO WO 2015/018205 A1 2/2015
WO WO 2017/083664 A2 5/2017
WO WO-2017143148 A2 8/2017
WO WO-2018136777 A1 7/2018
WO WO-2019014442 A1 1/2019
WO WO-2019055932 A1 3/2019

OTHER PUBLICATIONS

Final Office Action mailed Dec. 26, 2017 for U.S. Appl. No. 15/419,627, 10 pages.
Non-Final Office Action mailed Jul. 27, 2018 for U.S. Appl. No. 15/419,627, 17 pages.
Final Office Action mailed Apr. 15, 2019 for U.S. Appl. No. 15/419,627, 17 pages.
Non-Final Office Action mailed Dec. 31, 2019 for U.S. Appl. No. 16/591,843, 14 pages.
Non-Final Office Action mailed Jun. 16, 2017 for U.S. Appl. No. 15/487,835, 15 pages.
Non-Final Office Action mailed Oct. 2, 2017 for U.S. Appl. No. 15/487,835, 18 pages.
Non-Final Office Action mailed Jul. 3, 2019 for U.S. Appl. No. 15/942,860, 10 pages.
Final Office Action mailed Dec. 20, 2019 for U.S. Appl. No. 15/942,860, 8 pages.
Non-Final Office Action mailed May 4, 2020 for U.S. Appl. No. 15/942,860, 12 pages.
Non-Final Office Action mailed May 12, 2020 for U.S. Appl. No. 16/133,267, 12 pages.

(56) References Cited

OTHER PUBLICATIONS

Notice of Allowance mailed Dec. 9, 2020 for U.S. Appl. No. 16/133,267, 10 pages.
Non-Final Office Action mailed May 27, 2021 for U.S. Appl. No. 17/203,209, 17 pages.
Final Office Action mailed Sep. 9, 2021 for U.S. Appl. No. 17/203,209, 17 pages.
Invitation to Pay Additional Fees mailed Feb. 24, 2017 for International Application No. PCT/US2016/061549, 2 pages.
International Search Report and Written Opinion mailed May 22, 2017 for International Application No. PCT/US2016/061549, 13 pages.
Examination Report No. 1 dated May 29, 2020 for Australian Application No. 2016354522, 3 pages.
Notification of the First Office Action dated Apr. 26, 2021 for Chinese Application No. 201680065950.X, with English translation, 30 pages.
Notification of the Second Office Action dated Jan. 28, 2022, for Chinese Patent Application No. 201680065950.X, with English translation, 5 pages.
Extended European Search Report dated Jun. 18, 2019 for European Application No. 16865091.9, 7 pages.
Examination Report dated Mar. 25, 2021 for European Application No. 16865091.9, 5 pages.
Notice of Reasons for Rejection dated Dec. 24, 2020 for Japanese Application No. 2018-521215, with English translation, 16 pages.
International Search Report and Written Opinion mailed Jul. 25, 2017 for International Application No. PCT/US2017/018312, 14 pages.
International Search Report and Written Opinion mailed Nov. 5, 2018 for International Application No. PCT/US2018/041819, 11 pages.
First Office Action dated May 24, 2021 for Chinese Application No. 201880059416.7, with English translation, 21 pages.
Extended European Search Report dated Feb. 15, 2021 for European Application No. 18832831.4, 6 pages.
International Search Report and Written Opinion mailed Nov. 23, 2018 for International Application No. PCT/US2018/051367, 14 pages.
Extended European Search Report dated Jul. 26, 2021 for European Application No. 18855749.0, 7 pages.
"Are You Storing Food Safely," Refrigeration, Jun. 8, 2009, https://web.archive.org/web/20090608062550/www.fda.gov:80/ForConsumers/ConsumerUpdates/ucm093704.htm, 4 pages.
"June Intelligent Oven—The Computer-based Oven That Thinks Like a Chef," Jul. 15, 2015, [retrieved from the Internet on Mar. 7, 2017], <URL: https://juneoven.com/the-oven>, 25 pages.
"Meet Mellow: the Smart Sous-Vide Machine," Apr. 28, 2014, [retrieved from the Internet on Mar. 7, 2017], <URL: https://cookmellow.com/technology#anchor>, 12 pages.
Sous Vide, published Aug. 18, 2015, http://web.archive.org/web/20150818223717/https://www.molecularrecipes.com/sous-vide-class/sous-vide-cooking-time-temperature/, 2015, 8 pages.
"Thermonix USA: Home Cooking, Made Easy," Feb. 5, 2001, [retrieved from the Internet on Mar. 7, 2017], <URL: https://thermonix-state-of-the-art-machinery-specs/>, 5 pages.
"Why Sous Vide Supreme?," Sous-Vide Supreme—Official Site, Sep. 19, 2010, [retrieved from the Internet on Mar. 7, 2017], <URL: https://sousvidesupreme.com/en-us/learn/why-sousvide-supreme.htm/>, 10 pages.
Examination Report No. 1, dated Jun. 29, 2022, for Australian Patent Application No. 2021203230 (3 total pages).
Extended European Search Report, dated Nov. 9, 2022, for European Patent Application No. 22172646.6 (8 total pages).
Final Office Action mailed Dec. 7, 2020 for U.S. Appl. No. 15/942,860, 11 pages.
Iborra-Bernad, C., et al., "Comparison of Vacuum Treatments and Traditional Cooking Using Instrumental and Sensory Analysis," Food Analytical Methods, vol. 7, Issue 2, pp. 400-408 (May 2013).
Invitation to Pay Additional Fees mailed Aug. 31, 2018 for International Application No. PCT/US2018/041819 (2 pages).
Ju, Meiling, et al., "Influence of Different Cooking Methods on the Macronutrients in Ordinary Goose Liver," Culinary Science Journal of Yangzhou University, vol. 29, Issue 1, pp. 37-39 (Mar. 2012).
Non-Final Rejection for U.S. Appl. No. 17/592,225, mailed on Jul. 14, 2022, 16 pages.
Notice of Reasons for Rejection dated Aug. 16, 2022 for Japanese Application No. 2021-146475 (with English translation) (9 total pages).
Notice of Reasons for Rejection, mailed Aug. 16, 2022, for Japanese Application No. 2020-500726 (with English translation) (9 total pages).
Notification of the First Office Action dated Sep. 14, 2022 for Chinese Application No. 201880074018.2 (with English translation) (18 total pages).
Office Action for Korean Application No. KR20207004075, mailed on Apr. 21, 2022 (with English translation) (10 total pages).
Rejection Decision, dated Sep. 2, 2022, for Chinese Application Patent No. .201680065950 (with English translation) (9 total pages).
Baerdemaeker, "Equipment considerations for sous vide cooking," Food Control, vol. 6, Issue 4, pp. 229-236 (Aug. 1995).
Bu, Jun-zhi et al., Research Status of French Low Temperature Vacuum Cuisine (Sous Vide), Journal of Researches on Dietetic Science and Culture, vol. 31, pp. 48-52 (2014).
Examination Report for Canadian Application No. 3,004,326 dated Dec. 8, 2022, 3 pages.
Junxing, Pan, "Consideration of volume allowance in the design of cryogenic liquid containers," Chemical Equipment Technology, Issue 06, Dec. 5, 1997, 1 page.
Non Final Office Action for U.S. Appl. No. 18/075,945 dated Apr. 17, 2023, 13 pages.
Non-Final Office Action for U.S. Appl. No. 17/016,939 mailed on Nov. 25, 2022, 12 pages.
Notice of Preliminary Rejection, dated Jan. 4, 2023, for Korean Application No. 10-2020-7010626 (16 total pages).
Office Action for Japanese Application No. JP20200514494 mailed Nov. 30, 2022, 18 pages.
Search Report, dated Jan. 3, 2023, for Chinese Application No. 201680065950.X (3 total pages).
Final Office Action for U.S. Appl. No. 17/016,939 dated Sep. 29, 2023, 13 pages.
Final Office Action for U.S. Appl. No. 18/075,945 dated Nov. 1, 2023, 14 pages.
Notice of Preliminary Rejection, dated Nov. 13, 2023, for Korean Patent Application No. 10-2023-7033889 (8 total pages).
Notification of Second Office Action, dated Jun. 3, 2023, for Chinese Application No. 201880074018.2 (12 total pages).
Office Action and Search Report for Chinese Application No. CN202210591157 dated Jul. 10, 2023, 10 pages.
Office Action for Australian Application No. AU20180300993 mailed Jul. 6, 2023, 5 pages.
Office Action for Australian Application No. AU20180333946 dated Jun. 30, 2023, 2 pages.
Office Action for Canadian Application No. 3,004,326 dated Sep. 19, 2023, 3 pages.
Office Action for Chinese Application No. CN201880074018.2 mailed Oct. 26, 2023, 13 pages.
Office Action for Japanese Application No. JP2020-514494 dated Aug. 31, 2023, 9 pages.
Office Action and Search report for Chinese Patent Application No. 202210591157.0 dated Apr. 15, 2024, 15 pages.
Office Action for European Patent Application No. 22172646.6 dated Dec. 21, 2023, 4 pages.
Office Action for European Patent Application No. 18855749.0 dated Mar. 11, 2024, 5 pages.
Office Action for Japanese Application No. 2020-514494 dated May 22, 2024, 14 pages.
Office Action for Korean Patent Application No. 10-2018-7015944 dated Feb. 28, 2024, 23 pages.
Office Action for Korean Patent Application No. 10-2023-7033889 dated May 20, 2024, 7 pages.

(56) References Cited

OTHER PUBLICATIONS

Non-Final Office Action for U.S. Appl. No. 17/016,939 dated Nov. 21, 2024, 16 pages.
Non-Final Office Action for U.S. Appl. No. 18/075,945 dated Jul. 10, 2024, 15 pages.
Office Action and Search Report for Chinese Patent Application No. 202210591157.0, dated Sep. 20, 2024, 14 pages.
Office Action for European Patent Application No. 16865091.9 dated Oct. 16, 2024, 3 pages.
Office Action for Japanese Patent Application No. 2020-514494 dated Dec. 2, 2024, 13 pages.
Office Action for Japanese Patent Application No. 2023-082323, dated Aug. 29, 2024, 6 pages.
Office Action for Korean Patent Application No. 10-2023-7033889 dated Dec. 2, 2024, 12 pages.
Office Action for Korean Patent Application No. 10-2018-7015944, dated Jan. 22, 2025, 6 pages.
Final Office Action for U.S. Appl. No. 17/016,939 dated Aug. 27, 2025, 18 pages.
Final Office Action for U.S. Appl. No. 18/075,945 dated Feb. 25, 2025, 15 pages.
Non-Final Office Action for U.S. Appl. No. 18/075,945 dated Aug. 27, 2025, 15 pages.
Office Action and Search Report for Chinese Patent Application No. 202210591157.0 dated Mar. 7, 2025, with English Translation, 19 pages.
Office Action for Canadian Patent Application No. 3,197,614, dated Mar. 4, 2025, 3 pages.
Office Action for Japanese Patent Application No. 2023-082323 dated May 20, 2025, with English translation, 4 pages.
Office Action for Korean Patent Application No. 10-2023-7033889 dated Jun. 19, 2025, including English translation, 13 pages.
CN Application No. 202210591157.0, Office Action dated Sep. 30, 2025; Applicant Home Tech Innovation, Inc.; with English translation, 15 total pages.
CN Application No. 202210591157.0, Office Action dated Apr. 3, 2026; Applicant Home Tech Innovation, Inc.; with English translation 8 pages.
U.S. Appl. No. 18/075,945, Final Office Action dated Mar. 26, 2026; Inventor Liss, Robin et al.; 14 pages.

* cited by examiner

FOOD CARTRIDGES AND CARRIERS FOR USE IN A COOKING DEVICE

CROSS-REFERENCE TO RELATED APPLICATIONS

This application is a continuation of International Patent Application No. PCT/US2018/041819, filed Jul. 12, 2018, entitled "Food Cartridges and Carriers for Use in a Cooking Device," which claims priority to and the benefit of U.S. Provisional Patent Application Ser. No. 62/531,412, filed Jul. 12, 2017, entitled "Food Cartridges and Carriers for Use in a Cooking Device," the disclosure of each of which is hereby incorporated by reference in its entirety.

BACKGROUND

The embodiments described herein relate to apparatus and methods for cooking one or more food items and more specifically, to apparatus and methods for storing and/or cooking food items via a food storage and cooking device that includes a port configured to drain and/or siphon fluid from an inner volume of the food storage and cooking device.

Precision cooking techniques, such as sous-vide, have been developed as methods of cooking that are intended to maintain the integrity of food by heating the food for an extended period of time at a relatively low temperature, often in a sealed container that is submerged in a heated fluid. In some instances, a machine can contain a volume of water and can transfer thermal energy to the volume of water to reach and/or maintain a desired temperature thereof. The food in some precision cooking techniques (e.g., sous-vide cooking) is disposed in sealed or semi-permeable packages and/or bags, which can be inserted into the machine to submerge the food in the water. Prior to or directly after inserting the food, the water is heated to a temperature typically below the water's boiling point (e.g., around 60 degrees Celsius (° C.) or about 160 degrees Fahrenheit (° F.)). The thermal energy released by the hot water heats the submerged food until a temperature of the food and the temperature of the hot water are in a state of substantial thermal equilibrium. Thus, the food can be cooked to a desired temperature by controlling the temperature of the water in which the food is disposed.

Some known sous-vide cooking methods can involve a significant amount time in preparing the meal, which can, in some instances, present challenges for using sous-vide cooking methods on a daily basis. In addition, some known sous-vide cooking methods fail to provide a way to cook food having, for example, different cooking procedures, temperatures, and/or times. Moreover, in some instances, it is desirable to effectively manage and/or discard used cooking fluid without contaminating the food items and/or portions of the cooking device.

Thus, a need exists for improved apparatus and methods for storing and/or cooking food items via a food storage and cooking device.

SUMMARY

Systems, devices, and methods for storing and/or cooking food items via a food storage and cooking device are described herein. In some embodiments, a method of cooking a food item via the food storage and cooking device includes disposing a food item in a container. The container is positioned in the food storage and cooking device such that the inner volume of the food container can receive a flow of fluid and an outlet of the food container is substantially aligned with a drain. A volume of fluid is conveyed into the inner volume of the food container and has a temperature sufficient to cook the food item disposed in the inner volume of the food container. After a predetermined time, a flow of fluid is conveyed into the inner volume of the food container such that the volume of fluid in the inner volume of the food container exceeds a threshold volume of fluid. The volume of fluid in the inner volume of the food container is then drained automatically into the drain of the food storage and cooking device in response to the volume in the inner volume of the food container exceeding the threshold volume.

DETAILED DESCRIPTION

Figure 1:
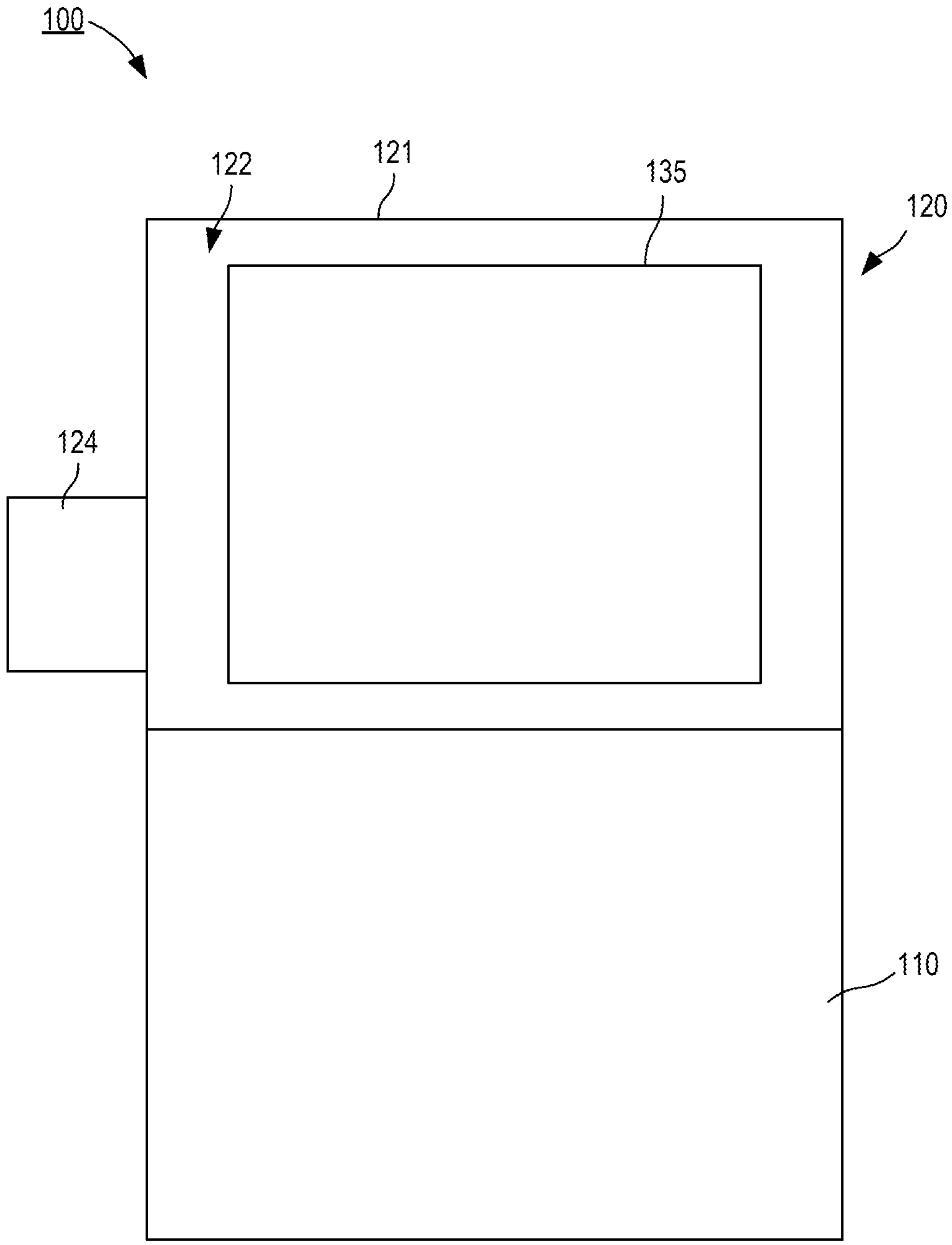
FIG. 1 is a schematic illustration of a food carrier, according to an embodiment.

In some embodiments, a method of cooking a food item in a food storage and cooking device includes disposing a food item in a container. The container is disposed in a portion of a carrier that is configured to receive a first volume of fluid. The food item is placed in contact with and receives thermal energy from the first volume of fluid when the first volume of fluid is disposed in the portion of the carrier. The carrier is disposed in a thermal container of a food storage and cooking device configured to receive thermal energy from a heating device (e.g., direct heating from a heating element) adjacent to, surrounding, or substantially surrounding the thermal container. After a predetermined time, the first volume of fluid is increased. The method includes draining the portion of the carrier in response to the first volume of fluid exceeding a threshold volume of fluid.

In some embodiments, a method of cooking a food item in a food storage and cooking device includes disposing a food item in a container. The container is disposed in a portion of a carrier that is configured to receive a first volume of fluid. The food item is placed in contact with and receives thermal energy from the first volume of fluid when the first volume of fluid is disposed in the portion of the carrier. The carrier is disposed in a thermal container of a food storage and cooking device configured to receive a second volume of fluid. The first volume of fluid is configured to receive thermal energy from the second volume of fluid. After a predetermined time, the first volume of fluid is increased. The method includes draining the portion of the carrier in response to the first volume of fluid exceeding a threshold volume of fluid.

In some embodiments, the method of cooking a food item in a food storage and cooking device includes placing the food item into an inner volume of the food container and positioning the food container in the food storage and cooking device such that the inner volume of the food container can receive a flow of fluid. In some embodiments, the food container is also or alternatively positioned in the food storage and cooking device such that an outlet of the food container is substantially aligned with a drain. In some embodiments, a volume of fluid is conveyed into the inner volume of the food container and has a temperature sufficient to cook the food item disposed in the inner volume of the food container. In some embodiments, after a predetermined time, a flow of fluid is conveyed into the inner volume of the food container such that the volume of fluid in the inner volume of the food container exceeds a threshold volume of fluid. In some embodiments, the volume of fluid in the inner volume of the food container is then drained automatically into the drain of the food storage and cooking device in response to the volume in the inner volume of the food container exceeding the threshold volume.

In some embodiments, the method of cooking the food item in a food storage and cooking device includes placing the food item into the inner volume of the food container and positioning the food container in a thermal container within the food storage and cooking device. In some embodiments, the thermal container is positioned within the food storage and cooking device such that an outlet of the food container is substantially aligned with a drain of the food storage and cooking device. In some embodiments, the method includes conveying a volume of fluid into the inner volume of the food container. In some embodiments, the method includes conveying a volume of fluid into the inner volume of the thermal container and outside of the food container. In some embodiments, thermal energy is then transferred from the volume of fluid in the inner volume of the thermal container to the volume of fluid in the inner volume of the food container such that a temperature of the volume of fluid in the inner volume reaches a predetermined threshold for a predetermined time. In some embodiments, the thermal energy transferred from the volume of fluid in the inner volume of the thermal container is sufficient to cook the food item stored in the inner volume of the food container. In some embodiments, after the predetermined time, a flow of fluid can be conveyed into the inner volume of the food container such that the volume of fluid within the inner volume of the food container exceeds a threshold volume of fluid. In some embodiments, the flow of fluid can have a temperature that is lower than the predetermined temperature such that conveying the flow of fluid slows or substantially stops the cooking of the food item. In some embodiments, the flow of fluid can have a temperature that is equal to or greater than the predetermined temperature such that conveying the flow of fluid continues to cook the food item. In some embodiments, when the volume of fluid in the inner volume of the food container exceeds a threshold volume, the volume of fluid can be automatically drained from the inner volume of the food container into the drain of the food storage and cooking device.

In some embodiments, the food container can be permanently positioned within the thermal container within the food storage and cooking device. In some embodiments, the food container, being permanently positioned within the thermal container, can be cleaned in situ between uses of the food storage and cooking device, e.g., by passing a solvent such as water or steam through the food container and out to the drain of the food storage and cooking device. In some embodiments, the food container can be removable such that the food item can be placed inside the food container before the food container is positioned within the thermal container. In some embodiments, the food container is permanently positioned within the thermal container, the thermal container being removable from the food storage and cooking device. In some embodiments, the food container can be cleaned between uses of the food storage and cooking device by removing the food container and thermal container assembly, passing a solvent such as water or steam through the food container and thermal container assembly, and repositioning the food container and thermal container assembly within the food storage and cooking device for subsequent use.

In some embodiments, the method of cooking a food item, for example via fluid-immersion cooking, includes placing a first food item into a first portion of a food carrier and disposing a second food item in a second portion of the food carrier. In some embodiments, the method includes positioning the food carrier in the thermal container such that an outlet of the second portion of the food carrier is substantially aligned with a drain of the food storage and cooking device. In some embodiments, the method includes conveying a first volume of fluid into the thermal container such that the first portion of the food carrier is submerged in the first volume of fluid and the second portion of the food carrier is partially submerged in the first volume of fluid. In some embodiments, the method includes conveying a second volume of fluid into the second portion of the food carrier, the second volume being fluidically isolated from the first volume of fluid. In some embodiments, the first volume of fluid and/or the second volume of fluid can have a temperature equal to or above a predetermined cooking temperature. In some embodiments, the first volume of fluid and/or the second volume of fluid can have a temperature equal to or below a predetermined storage temperature. In some embodiments, after a predetermined time, a flow of fluid can be conveyed into the second portion of the food carrier such that the volume of fluid within the second portion of the food carrier exceeds a threshold volume of fluid. In some embodiments, when the volume of fluid in the second portion of the food carrier exceeds a threshold volume, the volume of fluid can be automatically drained from the second portion of the food carrier into the drain of the food storage and cooking device.

As used in this specification, the singular forms “a,” “an” and “the” include plural referents unless the context clearly dictates otherwise. Thus, for example, the term “a member” is intended to mean a single member or a combination of members, “a material” is intended to mean one or more materials, or a combination thereof.

FIG. 1 is a schematic illustration of a food carrier 100 according to an embodiment. The food carrier 100 (also referred to herein as “carrier”) is configured to contain and/or receive one or more pre-packaged food items and further configured to be inserted into a cooking device (not shown in FIG. 1). For example, in some embodiments, the carrier 100 can be inserted into a sous-vide cooking device and/or other suitable fluid immersion cooking or storage device such as those described in U.S. Patent Publication No. 2017/0135383 entitled, "Apparatus and Methods for At Least Semi-Autonomous Meal Storage and Cooking Via Fluid Immersion," filed Jan. 30, 2017 (referred to henceforth as "the '383 publication"), the disclosure of which is incorporated herein by reference in its entirety. The carrier 100 can be inserted into any suitable cooking device or apparatus, without limitation, such that food disposed therein can be stored and/or cooked according to the methods of the device or apparatus. The carrier 100 can be used with and/or configured to receive unpackaged food items. Moreover, the carrier 100 can be used with and/or configured to receive one or more food packages. Such food packages can include individual food items or groups of food items contained within a packaging or the like. In some embodiments, such food packages can be substantially similar to those described in U.S. patent application Ser. No. 15/487,835 entitled, "Modular Food Cartridges for Use in a Cooking Device," filed Apr. 14, 2017 (referred to henceforth as "the '835 application"), the disclosure of which is incorporated herein by reference in its entirety.

In sum, the carrier 100 can receive and/or carry food within a sealed package or in a loose or bulk arrangement (e.g., not packaged). The carrier 100 can be disposed in a food storage and/or cooking device and/or system (e.g., the cooking device described in the '383 publication) configured to store food at a first temperature prior to cooking and configured to cook the food disposed therein at a second temperature greater than the first temperature via heat transfer a circulating fluid such as water to the food items. Such cooking devices can include a controller, at least one thermal container, and a fluid circulation system. The controller of such cooking devices can be any suitable electronic and/or electromechanical device configured to at least semi-autonomously control at least a portion thereof to store and cook food items placed therein; the thermal container(s) can receive, for example, the carrier 100 and one or more food items contained therein; and the fluid circulation system can circulate, cool, and/or heat a working fluid such as water contained in the cooking device.

The fluid circulation system can be any suitable shape, size, and/or configuration. The fluid circulation system is configured to regulate a temperature of a fluid such as, for example, water contained in a portion of the food storage and cooking device, for example, fluid flowing through the carrier 100, fluid contained about the carrier 100, or fluid flowing past the carrier 100. For example, the fluid circulation system can include any number of fluid conduits, tubing, pipes, valves, solenoids, pumps, fluid reservoirs, and/or the like that can collectively define any suitable number of fluid flow paths within the food storage and cooking device. Moreover, the fluid circulation system can include any number of heat exchangers and/or heat exchanger assemblies, heat sinks, heating elements, steamers, heat diffusers, cooling elements, chillers, and/or the like. In some embodiments, the fluid circulation system and/or a portion thereof can be similar in form and/or function to those described in the '383 publication. As such, the fluid circulation system can receive a signal and/or electrical power from the controller and/or power supply, respectively, which is operative to controlling, changing, maintaining, and/or otherwise regulating a temperature of a volume of fluid contained in at least a portion of the food storage and cooking device. In some embodiments, such fluid circulation systems can be substantially similar to those described in U.S. Provisional Patent Application No. 62/559,060, entitled, "Apparatus and Methods for at Least Semi-Autonomous Meal Storage and Cooking," filed Sep. 15, 2017 (referred to henceforth as "the '060 application"), and U.S. Provisional Patent Application No. 62/615,136, entitled, "Apparatus and Methods for at Least Semi-Autonomous Meal Storage and Cooking," filed Jan. 9, 2018 (referred to henceforth as "the '136 application"), the disclosures of which are incorporated herein by reference in their entirety.

In use, the controller can send instructions and/or signals to the fluid circulation system, which in turn, can circulate a chilled or cool fluid operable to store the one or more food items carried by the carrier 100 and disposed in the thermal container(s) and/or can circulate a heated or relatively hot fluid operable to cook one or more food items carried by the carrier 100 and disposed in the thermal container(s). In this manner, the one or more food items contained in the carrier 100 can be stored in a suitable environment (e.g., at a suitable storage temperature). In response to a change in an operating condition and/or based on instructions and/or signals at or from the controller, the cooking device can cook the food items contained therein at or to a desired temperature (e.g., at a suitable cooking temperature). Moreover, the arrangement of the carrier 100 can facilitate the placement of the one or more food items in the thermal container(s) of the cooking device and/or can facilitate the safe operation of the cooking device, as described in further detail herein with reference to specific embodiments.

While the carrier 100 is described above as being used in a cooking device such as those described in the '383 publication, it should be understood that the embodiments described herein are not limited to use in the devices of the '383 publication; rather, the device or devices of the '383 publication are referenced by way of example to provide context where needed. While portions of the device or devices of the '383 publication are described herein, the discussion of the device or devices is not exhaustive. Such discussion is intended to provide a reference to the relevant features thereof to provide context for the detailed discussion of the embodiments (i.e., carriers) described herein.

The carrier 100 shown in FIG. 1 can be any suitable shape, size, and/or configuration. In some embodiments, the carrier 100 can have a size and/or shape that is based at least in part on a thermal container of a cooking device into which the carrier 100 is to be disposed. In some embodiments, the size and/or shape of the carrier 100 can be at least partially based on a size and/or type of food configured to be inserted into or carried by the carrier 100. For example, the carrier 100 can include one or more portions or sections configured to receive a particular food type or the like, as described in further detail herein.

The carrier 100 includes a first portion 110 and a second portion 120. The first portion 110 and the second portion 120 can be monolithically formed or can be formed independently and coupled together (e.g., during a manufacturing process or by a user). As shown in FIG. 1, the first portion 110 can be disposed below the second portion 120. In other embodiments, the first portion 110 can be disposed above the second portion 120 or can be at least partially adjacent to the second portion 120 (e.g., at least partially side-by-side). In some embodiments, the first portion 110 can form a basket or receptacle configured to receive one or more food items. In some embodiments, the first portion 110 can have a size and/or shape that is associated with and/or at least partially based on the one or more food items configured to be disposed therein. For example, in some embodiments, the first portion 110 can be configured to receive at least a vegetable, a sauce or seasoning, and/or a combination thereof. In other embodiments, the first portion 110 can be configured to receive any suitable food item.

The second portion 120 can be any suitable shape, size, and/or configuration. In some embodiments, for example, the second portion 120 can form a basket or reservoir. More particularly, the second portion 120 shown in FIG. 1 includes and/or forms a first container 121 that defines an inner volume 122. The first container 121 can be formed of any suitable material or combination of materials such as, for example, aluminum, stainless steel, ceramic, thermoplastic, and/or any other suitable material or combination of materials. The first container 121 is configured to receive a volume of fluid from the cooking device (not shown). For example, in some embodiments, the fluid circulation system of the cooking device can include one or more supply and/or drain lines or conduits that provide fluid to and/or drain fluid from the thermal contain in which the carrier 100 is to be disposed. In some embodiments, the arrangement of the supply line or conduit is such that at least a portion of the fluid transferred into the thermal container of the cooking device is transferred into the first container 121 of the carrier 100.

For example, a first volume of the fluid can be transferred into the thermal container of the cooking device and outside of the first container 121 of the carrier 100 and a second volume of the fluid can be transferred into the first container 121 disposed in the thermal container of the cooking device. As such, the first container 121 can receive a desired volume of fluid (e.g., the second volume of fluid), which in turn, can be used to heat and/or cook one or more food items contained in the second portion 120 of the carrier 100 (e.g., via a heat transfer from the second volume of fluid to the one or more food items). In some instances, the first volume of fluid disposed in the thermal container and outside of the first container 121 can likewise transfer thermal energy from the first volume of fluid through the first container 121 and to the second volume of fluid. In some such instances, this arrangement can increase an amount of thermal energy associated with the second volume of fluid contained in the first container 121, which in turn, can increase an amount of thermal energy available for transfer to the one or more food items. In some instances, such a process can be referred to as, for example, a double heating, double boiling, and/or the like.

As shown in FIG. 1, the first container 121 is coupled (e.g., physically and/or fluidically) to a port 124 configured to drain and/or siphon fluid from the inner volume 122 of the first container 121. In some embodiments, the port 124 can include a drain line or conduit that is fluidically coupled to the port and to a drain such that a volume of fluid can be selectively drained or siphoned from the inner volume 122. Although not shown in FIG. 1, in some embodiments, the arrangement of the drain line or conduit can be such that the drain line or conduit forms an inverted U-bend. For example, in some embodiments, the drain line or conduit can be physically and/or fluidically coupled to the port 124 (e.g., an outlet of the first container 121) at a first elevation and a portion of the drain line or conduit forming the inverted U-bend (also referred to herein as "U-bend") is at a second elevation greater than the first elevation. A portion of the drain line or conduit can then extend from the U-bend to the drain (e.g., in a downward direction). In some embodiments, such an arrangement can allow for a selective draining of at least a portion of the fluid contained in the first container 121 via a siphoning effect and/or the like. In some embodiments, the siphoning arrangement and/or any other suitable draining arrangement can be configured to fluidically isolate the volume of fluid being drained from the first container 121 from other volumes of fluid and/or other portions of the food storage and cooking device. For example, in some embodiments, at least a portion of the volume of fluid transferred into the first container 121 of the carrier 100 can be placed in contact with one or more food packages and/or one or more loose and/or unpackaged food items and as such, the used fluid may contain contaminants, undesirable microbes, and/or food particles such as starches or the like, which may negatively impact the safe performance of portions of the food storage and cooking device, as described in further detail herein with reference to specific embodiments.

While the port 124 is described above as being coupled to a drain line or conduit configured to drain the first container 121 via siphoning and/or the like, in other embodiments, the port 124 can be coupled to any suitable means for draining the first container 121. For example, in some embodiments, the port 124 can be coupled to a butterfly valve or the like configured to transition from a closed configuration to an open configuration to drain the first container 121. In other embodiments, the port 124 can be coupled to a pump such as a centrifugal pump, a peristaltic pump, and/or the like. For example, in some embodiments, a peristaltic pump can be used and can be configured to engage an outer portion of a drain line or conduit to create a suction force or the like operable to drain the first container 121. Moreover, with the peristaltic pump being in contact with the outer portion of the drain line or conduit, the pump does not contact used or waste fluid (e.g., the fluid after a cooking operation), which can simplify maintenance and facilitate cleanliness.

As shown in FIG. 1, the second portion 120 also includes a second container 135 that is configured to receive one or more food items and to be inserted into the inner volume 122 of the first container 121. As described in further detail herein, the second container 135 is configured to receive one or more food items and is configured to be inserted into the inner volume 122 of the first container 121 such that the second container 135 is at least partially submerged in the volume of fluid contained in the first container 121. The one or more food items can be any type of food such as, for example, a starch like pasta, rice, potatoes, etc. In other embodiments, the first portion 110 can be configured to receive any suitable food item.

The second container 135 can be formed of any suitable material or combination of materials such as, for example, aluminum, stainless steel, ceramic, thermoplastic, and/or any other suitable material or combination of materials. Although not shown in FIG. 1, in some embodiments, the second container 135 can be formed of a mesh or at least semi-permeable material configured to allow a flow of fluid through the second container 135. The arrangement of the second container 135 can be such that the one or more food items disposed in the second container 135 are at least partially submerged and/or placed in contact with the volume of fluid contained in the first container 121. In some embodiments, such an arrangement can allow an amount of thermal energy to be transferred from the volume of fluid contained in the first container 121 to the one or more food items contained in the second container 135, as described in further detail herein.

As described above, the first portion 110 and the second portion 120 of the carrier 100 are each configured to receive one or more food items. The one or more food items can be pre-packaged food items disposed in any suitable packaging, container, cartridge, bin, tin, bag, pouch, etc. In some embodiments, such a packaging or the like can be at least partially fluid permeable and/or can include at least a portion that is fluid permeable. In other embodiments, such a packaging or the like can be fluid impermeable (e.g., a packaging containing a sauce or the like can be fluid impermeable). In some embodiments, the one or more food items can be disposed in a packaging or cartridge such as, for example, those described in the '835 application.

For example, the one or more food items (e.g., vegetables, sauces, seasonings, etc.) can be disposed in a packaging and/or cartridge and can be positioned in the first portion 110 of the carrier 100. The carrier 100, in turn, can be disposed in a thermal container of a food storage and cooking device such as those described above. Thus, fluid disposed in and/or flowing through the thermal container can transfer thermal energy from or transfer thermal energy to the one or more food items disposed in the first portion 110 of the carrier 100. Likewise, one or more food items (e.g., starches and/or the like) can be disposed in a packaging and/or cartridge and can be positioned in the second portion 120 of the carrier 100, which in turn, is disposed in the thermal container of the food storage and cooking device. In other embodiments, the one or more food items can be loose, unpackaged, and/or in bulk and disposed within a portion of the carrier 100. For example, in some embodiments, the second container 135 of the second portion 120 can receive a loose or unpackaged amount of pasta or other starch and can be disposed within the inner volume 122 of the first container 121.

While the first portion 110 and the second portion 120 of the carrier 100 are described above as receiving, for example, a vegetable, sauce, or seasoning, and a starch, respectively, it should be understood that the particular food items are presented by way of example and not limitation. As described in detail in the '835 application, in some embodiments, a protein (e.g., meat) can be cooked via the food storage and cooking device in a process and/or following a method associated with cooking the protein. In the embodiments described herein, the carrier 100 is configured to receive and/or carry, for example, vegetables, starches, sauces, etc., which are cooked in a portion of the food storage and cooking device that is separated from a portion of the food storage and cooking device that is configured to receive, carry, and/or cook the protein. In some embodiments, such a separation can be desirable to ensure that the proper cooking method is being used for the type of food product. In other embodiments, however, it should be understood that the protein can be disposed in one or more carriers, etc.

FIGS. 2-6 illustrate a food carrier 200 according to an embodiment. In some embodiments, the food carrier 200 and/or portions of the food carrier 200 can be substantially similar in form and/or function to the food carrier (or portions thereof) described in the '835 application. For example, the food carrier 200 (also referred to herein as "carrier") is configured to contain and/or receive one or more food items and further configured to be inserted into a cooking device, as described above with reference to the carrier 100 shown in FIG. 1. In some embodiments, the one or more food items can be pre-packaged or the like such as those described in the '835 application. In other embodiments, the carrier 200 can receive one or more loose or unpackaged food items or can receive any suitable combination of pre-packaged and unpackaged food items.

In some embodiments, the carrier 200 can be inserted into a sous-vide cooking device and/or other suitable fluid immersion cooking or storage device such as those described in the '383 publication. As described in detail above, such a cooking device can include a thermal container having a first portion (or volume) and a second portion (or volume). The first portion can be configured to receive, for example, a first food cartridge (or package) that contains, for example, a first kind of food (e.g., meats and/or other proteins). As such, the first portion of the thermal container can receive a flow of fluid that is operable in (1) storing the food contained therein at a desired storage temperature and/or (2) cooking the food contained therein at or to a desired cooking temperature, as described in detail in the '383 publication and/or the '835 application. While such cooking devices can store and/or cook the first kind of food (e.g., protein) in the first portion of the thermal container, this functionality is not the focus of this application and thus, is not described in further detail herein.

The second portion of the thermal container of such cooking devices can be configured to receive the carrier 200 including and/or carrying one or more food cartridges, packages, and/or loose food items that contain(s), for example, at least a second kind of food (e.g., vegetables, starches, carbohydrates, sauces, and/or the like). As such, the second portion of the thermal container can receive a flow of fluid that is operable in (1) storing the food contained therein at a desired storage temperature and/or (2) cooking the food contained therein at or to a desired cooking temperature. In some embodiments, the second portion of the thermal container can have a size and/or shape that is different from a size and/or shape of the first portion, which in turn, can ensure that the carrier 200 is positioned in the desired portion of the thermal container (e.g., the second portion) and in a predetermined orientation. When the carrier 200 is inserted into such a cooking and/or storage device, the one or more food items contained in carrier 200 can be stored in a suitable environment (e.g., at a suitable storage temperature) and in response to a change in an operating condition of the cooking and/or storage device, can be cooked at and/or to a desired temperature (e.g., at a suitable cooking temperature), as described in further detail herein.

The carrier 200 shown in FIGS. 2-6 can be any suitable shape, size, and/or configuration. In some embodiments, the carrier 200 can have a size and/or shape that is based at least in part on a thermal container or a portion of a thermal container into which the carrier 200 is to be disposed. In some embodiments, the size and/or shape of the carrier 200 can be at least partially based on a size and/or type of food configured to be inserted into or carried by the carrier 200. For example, the carrier 200 includes a first portion 210 and a second portion 220, each of which is configured to receive a particular food type or the like. In some embodiments, the first portion 210 of the carrier 200 is configured to receive and/or contain a first food item such as, for example, one or more vegetables. The first portion of the carrier 200 can also receive and/or contain a second food item such as, for example, a sauce or the like. In some embodiments, the second portion 220 of the carrier 200 is configured to receive and/or container a third food item such as, for example, a starch (e.g., rice, pasta, etc.).

The carrier 200 can be formed of any suitable material such as one or more plastics, polymers, metals, metal alloys, etc. In some embodiments, the carrier 200 can be configured for a single use and can be discarded with the food compartments once the food items are removed therefrom. In other embodiments, the carrier 200 can be reusable (e.g., can be used in multiple cycles of storing and/or cooking the food items contained in the food compartments. In still other embodiments, at least a portion of the carrier 200 can be operably or movably coupled to the cooking device. For example, in some embodiments, the carrier 200 can move along a path or track and/or via one or more sliders, rollers, etc. from a position outside of the thermal container (e.g., a loading and/or unloading position) to a position inside of the thermal container (e.g., a storage and/or cooking position).

Figure 2:
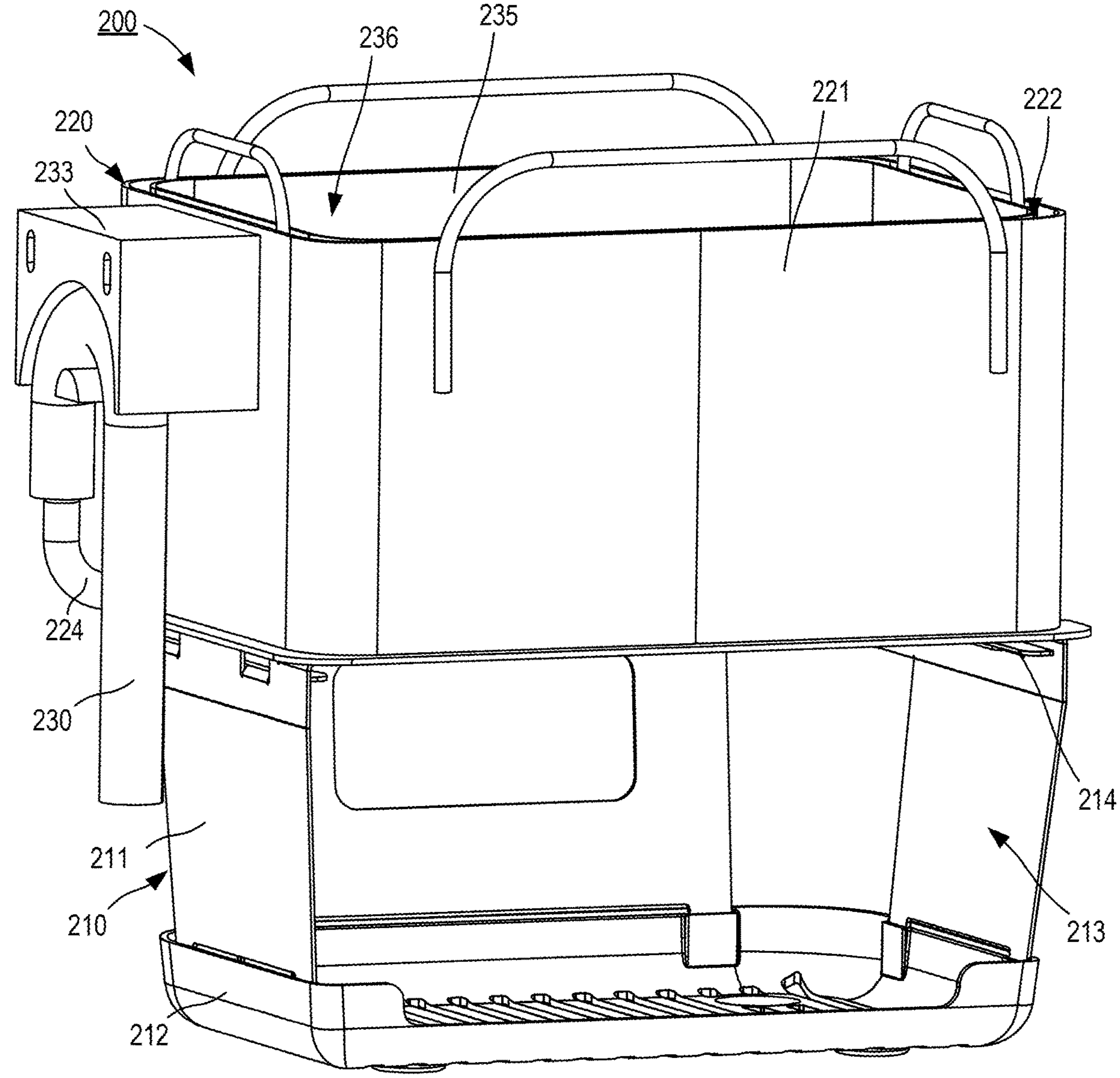
FIG. 2 is a perspective view of a food carrier, according to an embodiment.

The first portion 210 and the second portion 220 of the carrier 200 can be monolithically formed or can be formed independently and coupled together (e.g., during a manufacturing process or by a user). As shown in FIG. 2, the first portion 210 can be disposed below the second portion 220. In other embodiments, the first portion 210 can be disposed above the second portion 220 or can be at least partially adjacent to the second portion 220 (e.g., at least partially side-by-side).

Figure 3:
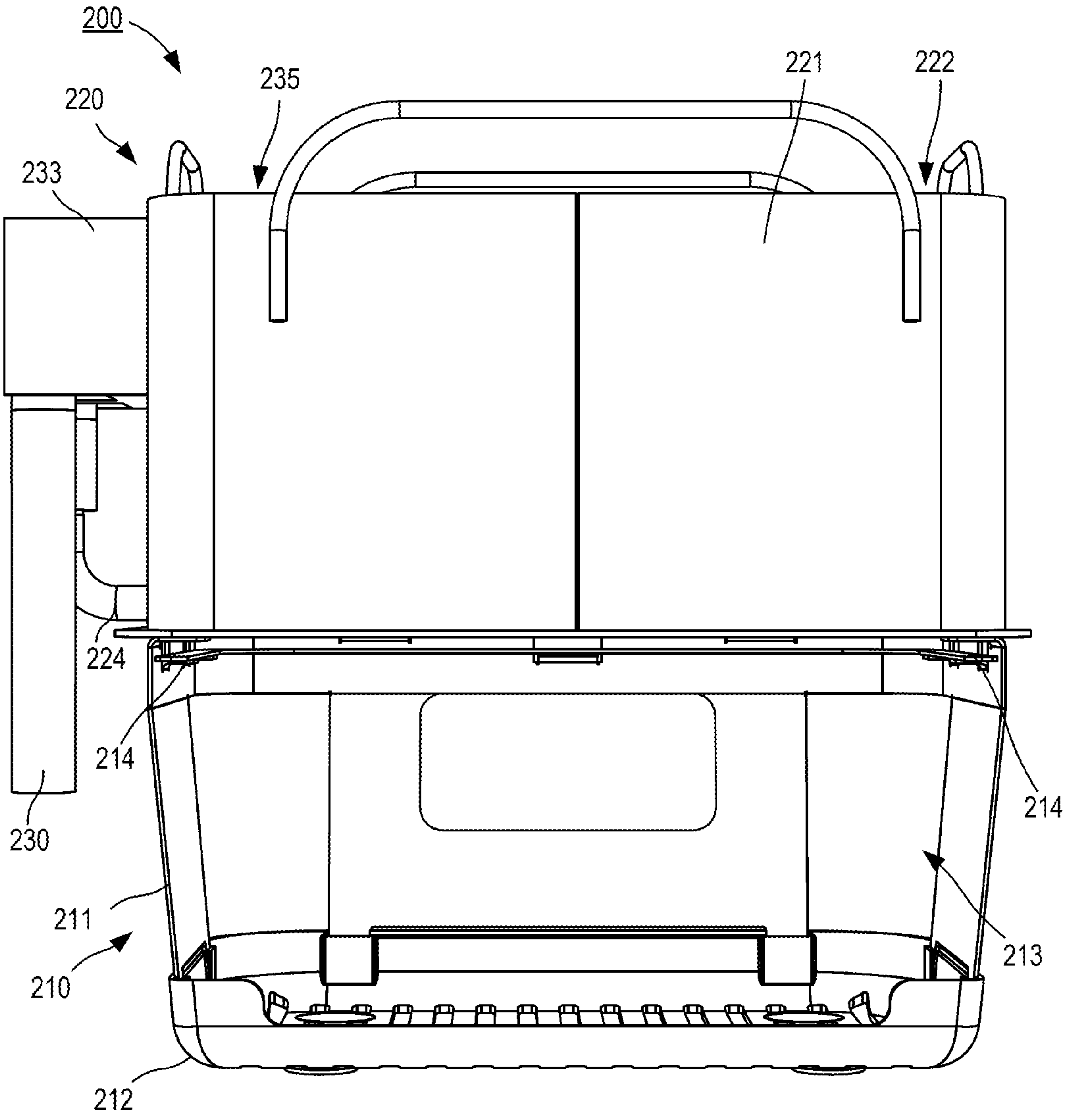
FIG. 3 is a front view of the food carrier illustrated in FIG. 2.
Figure 4:
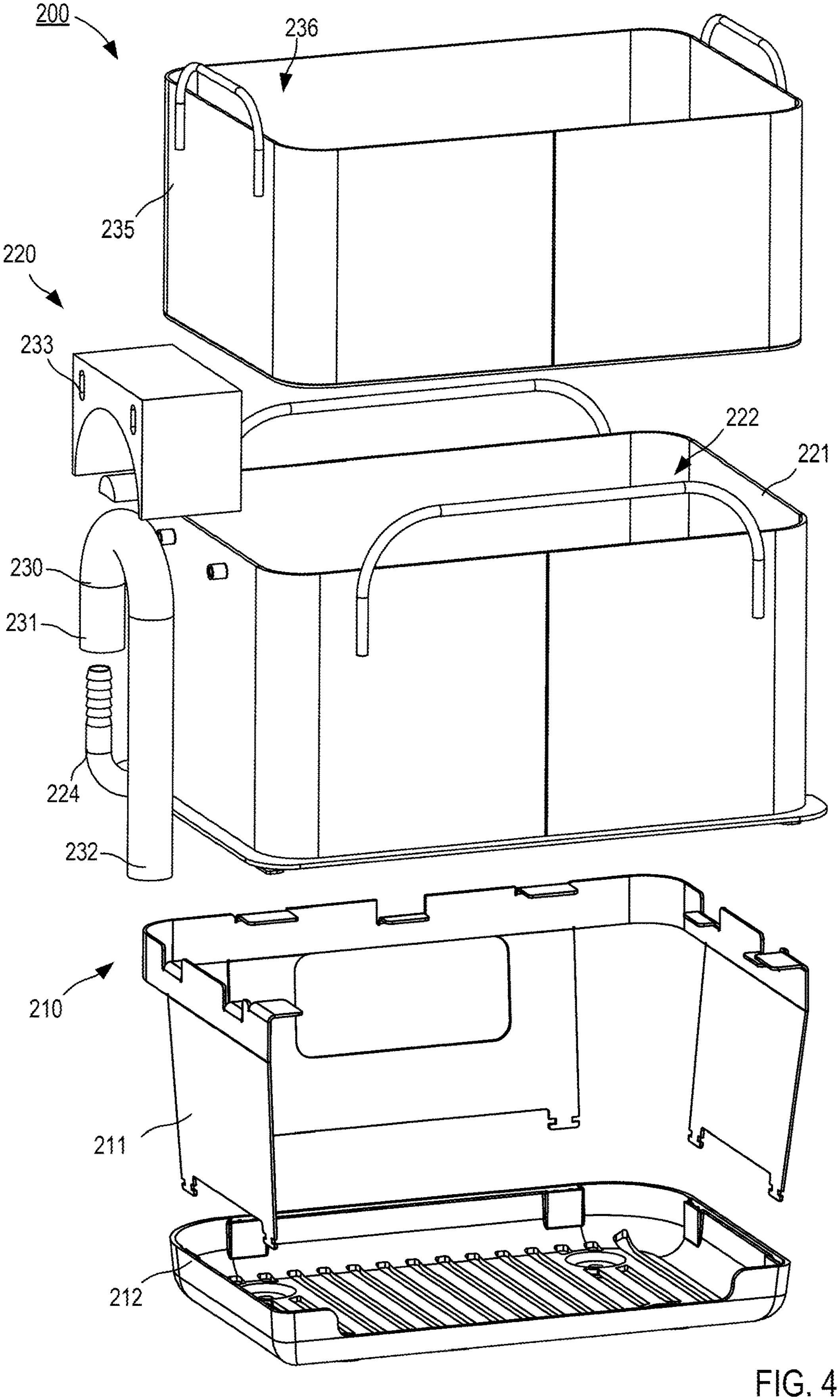
FIG. 4 is an exploded view of the food carrier illustrated in FIG. 2.

As shown in FIGS. 2-4, the first portion 210 includes a set of sidewalls 211 and a base 212 that collectively form and/or define an inner volume 213. In some embodiments, the first portion 210 can form a basket or receptacle configured to receive one or more food items. For example, in some embodiments, the first portion 210 can be configured to receive at least a vegetable, a sauce or seasoning, and/or a combination thereof. In other embodiments, the first portion 210 can be configured to receive any suitable food item. Although not shown in FIGS. 2-6, in some embodiments, the one or more food items can be disposed in a cartridge, a fluid permeable bag, a pouch, a container, etc. For example, the first portion 210 of the carrier 200 can include and/or can form a track 214 (e.g., a rail, ledge, slot, tab, protrusion, etc.) on which a flange of a food cartridge can rest. In this manner, the food cartridge can be positioned on the track 214 and retained in a desired position within the inner volume 213 defined by the first portion 210. In some embodiments, this arrangement can allow, for example, a first food item and a second food item to be disposed in the inner volume 213. In some embodiments, the food cartridge resting on or being in contact with the track 214 (e.g., the first food item) can include a vegetable and the other food cartridge (e.g., the second food item) can include a sauce or the like or vice versa. Although the first portion 210 is shown and described as including the track 214 configured to receive and/or engage a portion of a food cartridge, in other embodiments, the first portion 210 can include any suitable, shelf, ledge, stand, retainer, divider, etc. For example, in some embodiments, the first portion 210 can include a shelf that spans substantially across the first portion 210 and that can receive, engage, contact, and/or support a food cartridge disposed thereon.

The second portion 220 of the carrier 200 can be any suitable shape, size, and/or configuration. For example, in the embodiment shown in FIGS. 2-6, the second portion 220 can form a basket or reservoir. More particularly, the second portion 220 includes and/or forms a first container 221 that defines an inner volume 222. The first container 221 can be formed of any suitable material or combination of materials such as, for example, aluminum, stainless steel, ceramic, thermoplastic, and/or any other suitable material or combination of materials. The first container 221 is configured to receive a volume of fluid from the cooking device (not shown). For example, in some embodiments, a fluid circulation system of the cooking device can provide fluid to and/or drain fluid from the thermal contain in which the carrier 200 is to be disposed such that at least a portion of the fluid transferred into the thermal container of the cooking device is transferred into the first container 221 of the carrier 200, as described in further detail herein.

Figure 5:
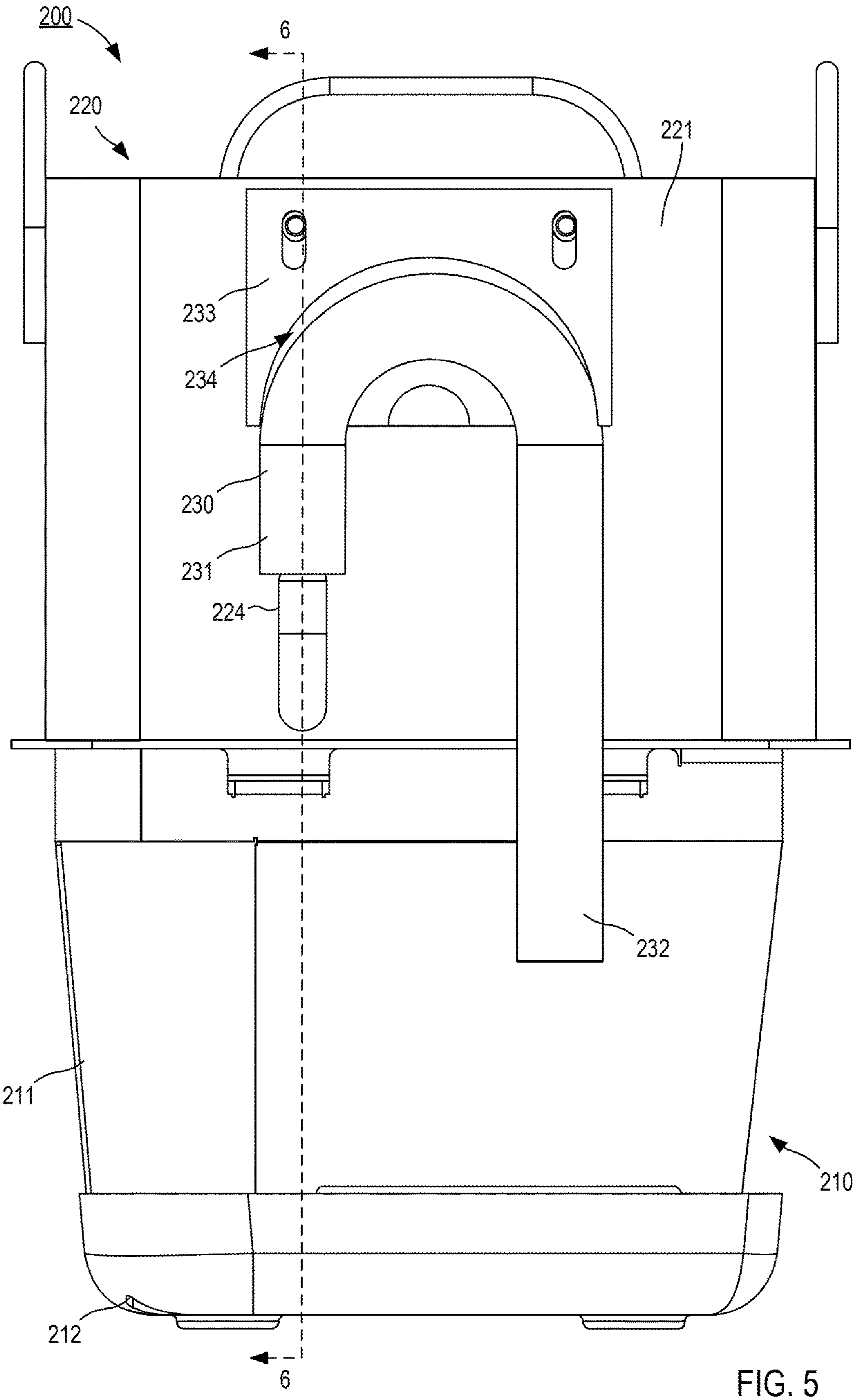
FIG. 5 is a side view of the food carrier illustrated in FIG. 2.
Figure 6:
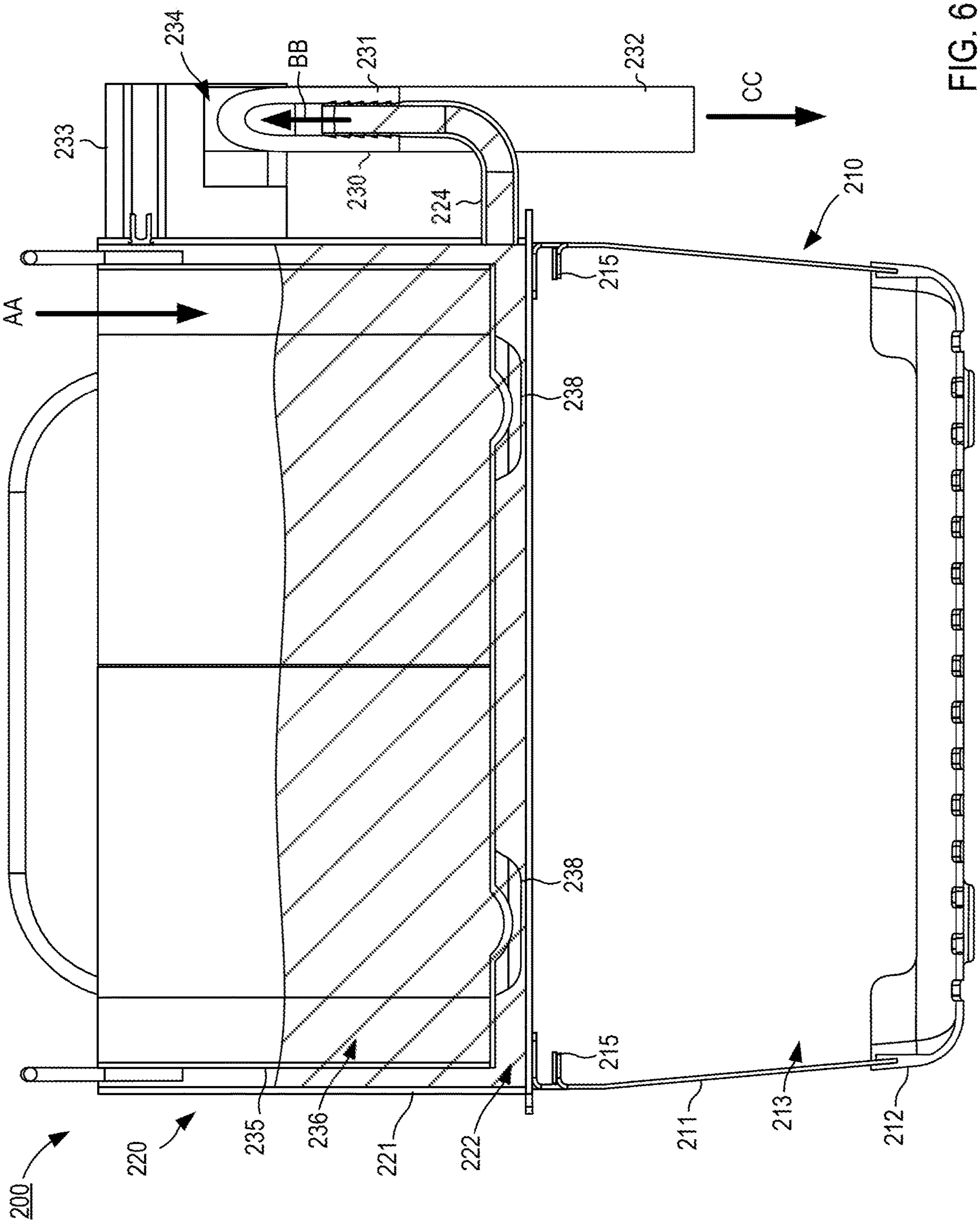
FIG. 6 is a cross-sectional view of the food carrier illustrated in FIG. 5, taken along the line 6-6.

As shown, for example, in FIGS. 4-6, the first container 221 is coupled (e.g., physically and/or fluidically) to a port 224 configured to drain and/or siphon fluid from the inner volume 222 of the first container 221. The port 224 includes and/or is physically and fluidically coupled to a drain line 230 that extends from the port 224 and forms an inverted U-bend. For example, the first container 221 is coupled to a guide block 233 that defines a U-shaped channel 234. As shown in FIG. 5, a first end portion 231 of the drain line 230 is physically and/or fluidically coupled to the port 224 at a first elevation and a portion of the drain line 230 extends from the port 224 and through the U-shaped channel 232 of the guide block 231 to form the inverted U-bend (referred to henceforth as "U-bend") of the drain line 230 at a second elevation greater than the first elevation. In addition, a second end portion 232 of the drain line 230 extends from the U-bend and is at a third elevation less than the first elevation. Although not shown, the second end portion 232 of the drain line 230 is configured to be placed in fluid communication with a drain volume of the cooking device. As described in further detail herein, such an arrangement can allow for a selective draining of at least a portion of the fluid contained in the first container 221 via a siphoning effect and/or the like.

The second portion 220 also includes a second container 235 configured to be at least partially disposed in the inner volume 222 of the first container 221. The second container 235 defines an inner volume 236 that is configured to receive one or more food items. The second container 235 can be formed of any suitable material or combination of materials such as, for example, aluminum, stainless steel, ceramic, thermoplastic, and/or any other suitable material or combination of materials. In some embodiments, the second container 235 can be formed of a mesh or at least semi-permeable material configured to allow a flow of fluid through the second container 235. Moreover, as shown in FIG. 6, the second container 235 includes a set of protrusions or feet 238 disposed at or along a base of the second container 235. In some embodiments, the protrusions or feet 238 can offset and/or separate at least a portion of the second container 235 from the first container 221, which in turn, can facilitate the flow of fluid into or out of the second container 235. The arrangement of the second container 235 can be such that the one or more food items disposed in the second container 235 are at least partially submerged and/or placed in contact with the volume of fluid contained in the first container 221. In some embodiments, such an arrangement can allow an amount of thermal energy to be transferred from the volume of fluid contained in the first container 221 to the one or more food items contained in the second container 235.

For example, as described above, a volume of the fluid can be transferred into the thermal container of the cooking device. In some embodiments, the arrangement of the cooking device and the carrier 200 is such that when the carrier 200 is disposed in the thermal container, a first portion of the volume of fluid is transferred into the thermal container and outside of the first container 221, while a second portion of the volume of fluid is transferred into the first container 221 of the carrier 200. As such, the first container 221 can receive a desired volume of fluid (e.g., the second portion of the volume), which in turn, can be used to heat and/or cook one or more food items contained in the second portion 220 of the carrier 200. For example, in some embodiments, forming the second container 235 of or from a mesh or at least semi-permeable material can be such that the one or more food items contained in the second container 235 are submerged in the second portion of the volume of fluid and thus, a desired amount of thermal energy can be transferred from the second portion of the volume of fluid to the one or more food items.

In some instances, the first portion of the volume of fluid disposed in the thermal container and outside of the first container 221 can likewise transfer thermal energy from the first portion of the volume of fluid, through the first container 221, to the second portion of the volume of fluid. In some such instances, this arrangement can increase an amount of thermal energy associated with the second portion of the volume of fluid contained in the first container 221, which in turn, can increase an amount of thermal energy available for transfer to the one or more food items. In some instances, such a process can be referred to as, for example, a double heating, double boiling, and/or the like, as described in further detail herein.

As described above, the first portion 210 and the second portion 220 of the carrier 200 are each configured to receive one or more food items. The one or more food items can be pre-packaged food items disposed in any suitable packaging, container, cartridge, bin, tin, bag, pouch, etc. In some embodiments, such a packaging or the like can be at least partially fluid permeable and/or can include at least a portion that is fluid permeable. In other embodiments, such a packaging or the like can be fluid impermeable (e.g., a packaging containing a sauce or the like can be fluid impermeable). In some embodiments, the one or more food items can be disposed in a packaging or cartridge such as, for example, those described in the '835 application. In still other embodiments, any of the food items can be unpackaged or loose (e.g., the starch disposed in the second portion 220 of the carrier 200).

For example, in use, one or more food items (e.g., vegetables, sauces, seasonings, etc.) can be disposed in the first portion 210 of the carrier 200 and one or more food items (e.g., starches and/or the like) can be disposed in the second container 235 of the second portion 220. With the food items contained in the first portion 210 and second portion 220, the carrier 200 can be disposed in a thermal container of a food storage and cooking device (referred to herein as "cooking device") such as those described in the '383 publication. As described above, in some embodiments, the size and/or shape of the carrier 200 can be such that the carrier 200 is inserted into a desired portion of the thermal container in a predetermined orientation or the like. More particularly, the carrier 200 can be inserted into the thermal container such that the second end portion 232 of the drain line 230 is aligned with and/or otherwise placed in fluid communication with a drain volume of the cooking device.

In some embodiments, the cooking device can receive and/or can determine information and/or data associated with the food items when the carrier 200 is positioned in the thermal container. For example, the packages and/or cartridges in which the food items are disposed can include any suitable identification and/or communication device. For example, in some embodiments, each package and/or cartridge can include a barcode, a quick response (QR) code, a near field communication (NFC) device or radio, a radio frequency identification (RFID) device or radio, and/or the like configured to transmit and/or otherwise relay information associated with the food item contained in the package and/or cartridge. In addition, the cooking device 10 can include a corresponding scanner, reader, and/or transceiver configured to communicate with the identification and/or communication device of the packages and/or cartridges. Thus, based on the data and/or information associated with the food items, the cooking device can determine and/or reference data associated with storing and/or cooking the food items (e.g., storing and/or cooking instructions, times, temperatures, expiration dates, and/or any other suitable information). In instances in which one or more of the food items is unpackaged and/or loose, a user can input data into the cooking device and/or can use a remote electronic device configured to communicate with the cooking device to provide data associated with the food item(s). For example, in some instances, a user can use mobile device (e.g., a smartphone or the like) and a mobile application to send data associated with the food item(s) to the cooking device.

In some instances, the cooking device can be in a storage configuration in which the cooking device stores the food items contained therein at a predetermined and/or desired temperature as described in detail in the '383 publication. In some instances, the cooking device can be configured to transition from the storage configuration to a cooking configuration by, for example, activating one or more heating elements and controlling a flow of fluid through the one or more heating elements and into the thermal container. In this manner, the heated fluid can flow into the thermal container (or portion thereof) in which the carrier 200 is disposed. In some instances, the heated fluid can be, for example, sub-boiling or less than about 212° F., while nonetheless, having a sufficient amount of thermal energy to cook the food items contained in the carrier 200. In other embodiments, some or all of the food items contained in the carrier 200 can be cooked (at least partially) via a heated fluid at or above boiling (e.g., at or above 212° F.).

As described above, the arrangement of the cooking device and the carrier 200 can be such that a first portion of the volume of fluid is transferred into the thermal container and outside of the first container 221 while and a second portion of the volume of fluid is transferred into the first container 221 of the carrier 200. In some embodiments, the cooking device can be configured to distribute the amount or portions of the volume of fluid based at least in part on data and/or information associated with the food items (e.g., received via the user input and/or via the communication device(s) of the food cartridge(s)). The arrangement of the carrier 200 within the thermal container of the cooking device can be such that the food item(s) contained in the first portion 210 of the carrier 200 are submerged and/or substantially submerged in the first portion of the volume of fluid transferred into the thermal container. In this manner, thermal energy is transferred from the first portion of the volume of fluid to the food items contained in the first portion 210 of the carrier 200 such that the food items (e.g., vegetables and/or sauces) are cooked to a desired temperature.

In some embodiments, the cooking device can deliver the flow of fluid to the thermal container such that the second portion of the volume of heated fluid is transferred into the first container 221. In some embodiments, the second portion of the volume of fluid is sufficient to submerge the food items contained in the second container 235. More specifically, the food item (e.g., a starch such as rice, pasta, etc.) can be disposed in the inner volume 236 of the second container 235, which in turn, is positioned in the inner volume 222 of the first container 221. In some embodiments, the second container 235 can be formed of a mesh or semi-permeable material configured to allow fluid flow into and out of the inner volume 236. In this manner, the cooking device can transfer a volume of fluid into the first container 221 that is sufficient to submerge or at least partially submerge the food item contained therein.

In some embodiments, the controller of the cooking device can determine the sufficient volume of fluid based at least in part on data and/or information associated with the food item (e.g., received from the communication device of the food packaging and/or received via a user input, as described above). For example, the second container 235 can receive food items such as starches like pasta, rice, potatoes, etc., and a desired cooking temperature and/or cooking time may vary with the particular food item and/or recipe. Accordingly, based on information associated with the food item, the cooking device can selectively increase or decrease an amount of the first portion or second portion of the volume of fluid to selectively control an amount of thermal energy transferred to the food item.

As described above, the arrangement of the second portion 220 of the carrier 200 is such that the first portion of the volume of fluid disposed outside of the carrier 200 transfers thermal energy through the first container 221 and into the second portion of the volume of fluid disposed in the inner volume 222. In some instances, such an arrangement can increase an amount of thermal energy transferred to the food item(s) contained in the second container 235. In some instances, separating and/or selectively delivering the volume of fluid can allow for the food items disposed in the second portion 220 of the carrier 200 to be cooked at a different (e.g., higher) temperature than the food items disposed in the first portion 210 of the carrier 200. For example, in some embodiments, the double heating (e.g., via the first portion and the second portion of the volume of fluid) arrangement and/or configuration can be such that the food items contained in the second portion 220 of the carrier 200 are cooked near, at, or above boiling (e.g., near, at, or above 212° F.). In other embodiments, the thermal energy transferred from the first portion of fluid to the second portion of the fluid can be sufficient to equalize, recover, and/or otherwise negate losses in temperature of the second portion of the fluid (e.g., normal temperature losses due to cooking and/or losses to an ambient environment). In other words, the thermal energy transferred from the first portion of fluid to the second portion of fluid can reduce, limit, and/or slow a temperature drop in the second portion of fluid as thermal energy is transferred to the food items contained in the second portion 220 of the carrier 200. In some instances, such an arrangement can, for example, reduce a total cook time of the food items contained in the second portion of the carrier 200.

Once a desired amount of thermal energy is transferred to the food items contained in the second portion 220 of the carrier 200 and/or the food items have been cooked at a desired temperature for a predetermined time, the cooking device and/or the carrier 200 can be configured to initiate a draining of the first container 221. As described above, the first container 221 is coupled to and/or includes a port 224 and drain tube 230, which are configured to selectively siphon fluid from the first container 221. For example, the amount of fluid transferred into the first container 221 (e.g., the second portion of the volume of fluid) can be sufficient to submerge the food items contained therein. During a cooking process, the fluid can partially fill the port 224 and/or a portion of the drain tube 230 but the amount or volume of fluid (or a pressure associated therewith) is insufficient to raise a level of hydraulic head (elevation or the like) within the port 224 and/or drain tube 230 to the extent that the fluid flows through or over the inverted U-bend.

In contrast, once a desired amount of thermal energy is transferred to the food items contained in the second portion 220 of the carrier 200, an additional volume of fluid can be transferred into the first container 221, as indicated by the arrow AA in FIG. 6. In some instances, the increase volume of fluid and a resulting pressure associated with the increased volume can raise the level of hydraulic head in the port 224 and/or drain tube 230, and as such fluid can fill or substantially fill the inverted U-bend of the drain tube 230, as indicated by the arrow BB in FIG. 6. As the fluid fills the inverted U-bend, the fluid begins to flow from the inverted U-bend to the second end portion 232 of the drain tube 230, which in turn, is in fluid communication with a drain volume of the cooking device. Accordingly, the increase in volume in the first container 221 is sufficient to initiate a flow of the fluid through the drain tube 230 from the port 224 to through the second end portion 232, as indicated by the arrow CC in FIG. 6. Once the flow is initiated, the addition of fluid into the first container 221 can be stopped and the flow of fluid through the drain tube 230 can continue unaided via siphoning. That is to say, the drain tube 230 is arranged as a siphon in which a flow of fluid therethrough results in a pressure differential sufficient to urge substantially continuous and/or unaided fluid flow through the drain tube 230.

As just described, adding a predetermined amount of fluid to the first container 221 results in and/or is operable to drain the fluid from the first container 221. In some embodiments, the siphoning of the first container 221 is sufficient to drain substantially all of the fluid from the first container 221. In some embodiments, the protrusions and/or feet 238 of the second container 235 can elevate and/or separate the second container 235 from a base surface of the first container 221 a sufficient amount such that the food items contained in the second container 235 are disposed above and/or outside of any amount of fluid remaining in the first container 221.

In some embodiments, the siphoning arrangement and/or any other suitable draining arrangement can be configured to fluidically isolate the volume of fluid being drained from the first container 221 from other volumes of fluid and/or other portions of the food storage and cooking device. For example, in some embodiments, at least a portion of the volume of fluid transferred into the first container 221 of the carrier 200 can be placed in contact with one or more food packages and/or one or more loose and/or unpackaged food items and as such, the used fluid may contain contaminants, undesirable microbes, and/or food particles such as starches or the like, which may negatively impact the safe performance of portions of the food storage and cooking device, as described in further detail herein with reference to specific embodiments.

Once the food items in the carrier 200 are cooked, a user can remove the carrier 200 from the cooking device. In other embodiments, the cooking device can be configured to maintain the food at a warm storage temperature until the user removes the carrier 200. With the carrier 200 removed from the device, the user can open the food packages and/or can otherwise remove the food items for eating.

While the port 224 is described above as being coupled to a drain line 230 configured to drain the first container 221 via siphoning and/or the like, in other embodiments, the port 224 can be coupled to any suitable means for draining the first container 221. For example, in some embodiments, the port 224 can be coupled to a butterfly valve or the like configured to transition from a closed configuration to an open configuration to drain the first container 221. In other embodiments, the port 224 can be coupled to a pump or the like such as, for example, a peristaltic pump or the like. In such embodiments, the peristaltic pump can be configured to engage an outer portion of a drain line or conduit without to create a suction force or the like operable to drain the first container 221. Moreover, with the pump being in contact with the outer portion of the drain line or conduit, the pump does not contact used or waste fluid (e.g., the fluid after a cooking operation), which can simplify maintenance and facilitate cleanliness.

While the first portion 210 and the second portion 220 of the carrier 200 are described above as receiving, for example, a vegetable, sauce, or seasoning, and a starch, respectively, it should be understood that the particular food items are presented by way of example and not limitation. As described in detail in the '835 application, in some embodiments, a protein (e.g., meat) can be cooked via the food storage and cooking device in a process and/or following a method associated with cooking the protein. In the embodiments described herein, the carrier 200 is configured to receive and/or carry, for example, vegetables, starches, sauces, etc., which are cooked in a portion of the food storage and cooking device that is separated from a portion of the food storage and cooking device that is configured to receive, carry, and/or cook the protein. In some embodiments, such a separation can be desirable to ensure that the proper cooking method is being used for the type of food product. In other embodiments, however, it should be understood that the protein can be disposed in one or more carriers, etc.

Figure 7:
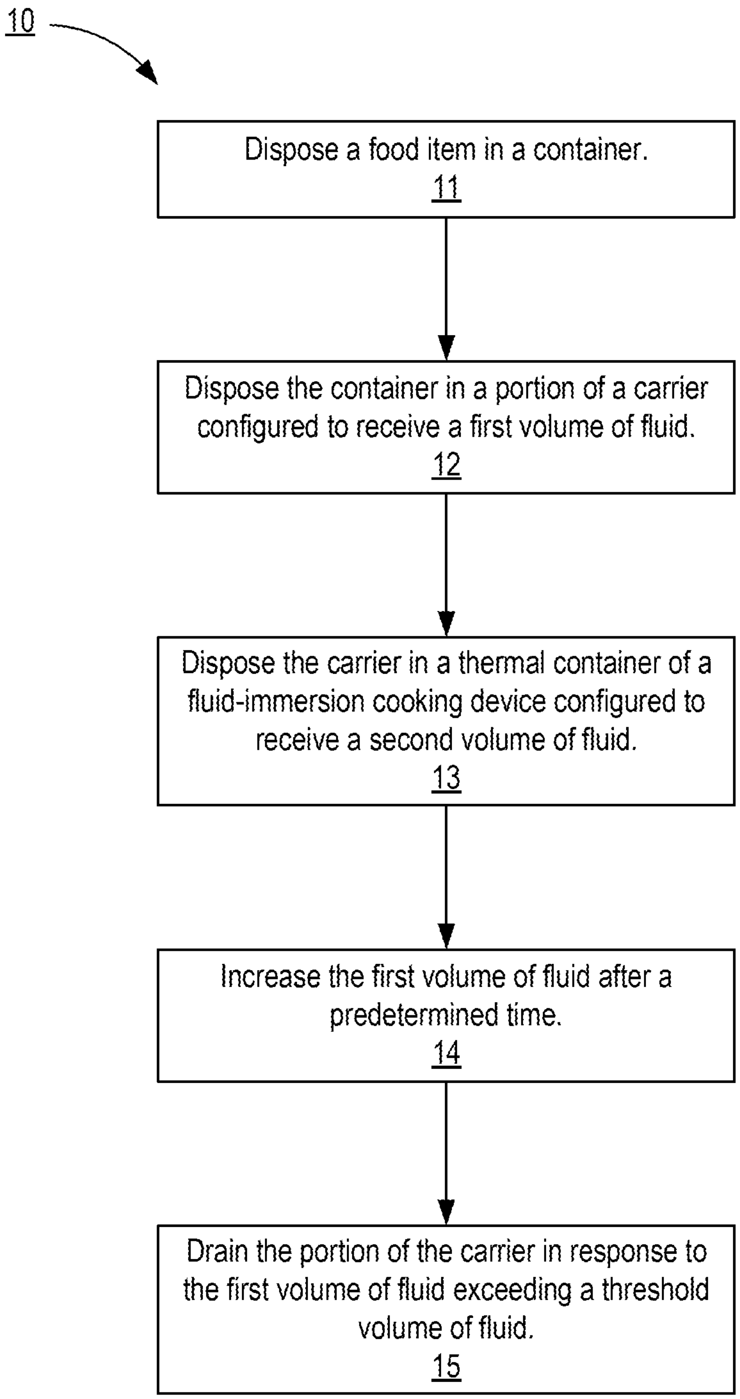
FIG. 7 is a flowchart illustrating a method for cooking a food item in a food storage and cooking device, according to an embodiment.

FIG. 7 is a flowchart illustrating a method 10 of cooking a food item via a food storage and cooking device according to an embodiment. The food storage and cooking device (also referred to herein as "cooking device") can be any suitable device such as those described in detail herein. In some embodiments, the cooking device can be substantially similar to and/or the same as those described in the '383 publication. In some embodiments, such a cooking device can be configured to circulate a volume of fluid through one or more thermal containers, each of which is configured to store and/or cook one or more food items. For example, in some instances, a volume of fluid contained in and/or flowing through at least a portion of the cooking device is cooled or chilled to a predetermined and/or desired storage temperature suitable for storing a food item (e.g., a first configuration). In response to a signal or a set of instructions, the cooking device can be transitioned to a second configuration in which the volume of fluid contained in and/or flowing through the portion of the cooking device is heated to a predetermined and/or desired cooking temperature suitable for cooking the food item.

As shown in FIG. 7, the method 10 includes disposing a food item in a container, at 11. The food item can be any suitable food item(s) such as those described herein. In some instances, for example, the food item can be a starch such as rice, pasta, potatoes, etc. In some embodiments, the food item can be disposed in a package, pouch, bag, container, and/or the like, which is at least partially fluid permeable. In other embodiments, the food item can be loose or unpackaged when disposed in the container. The container can be any suitable shape, size, and/or configuration. For example, in some embodiments, the container can be substantially similar to the second container 135 and/or 235 described in detail above. In some embodiments, the container is at least partially fluid permeable (e.g., can define one or more openings, can include and/or can be formed of a mesh material, and/or otherwise can allow for fluid flow into and out of the container).

The container is disposed in a portion of a carrier that is configured to receive a first volume of fluid, at 12. The carrier can be any suitable carrier such as, for example, the carrier 100 and/or 200 described in detail herein. As such, the carrier can include one or more portions configured to receive one or more food items. For example, in some embodiments, the carrier can include a first portion configured to receive at least a first food item such as a vegetable and a second portion configured to receive at least a second food item such as a starch. In the method 10 illustrated in FIG. 7, the container is configured to be disposed, for example, in the second portion of the carrier.

The carrier is disposed in the thermal container of the cooking device configured to receive a second volume of fluid, at 13. As described above, the cooking device can be configured to transfer and/or circulate fluid into or through the thermal container to cook one or more food items disposed therein. The arrangement of the carrier within the thermal container can be such that as the cooking device transferred the fluid into the thermal container, the first volume of the fluid is transferred into the portion of the carrier and the second volume of fluid is transferred into the thermal container and outside of the portion of the carrier. As such, the food item disposed in the container is at least partially submerged in the first volume of fluid and is configured to receive thermal energy from the first volume of fluid. Similarly, the portion of the carrier is at least partially disposed or submerged in the second volume of fluid such that thermal energy can be transferred from the second volume of fluid to the first volume of fluid, as described in detail above with reference to the carriers 100 and/or 200.

After a predetermined time, the first volume of fluid is increased, at 14. For example, in some instances, the predetermined time can be based on a desired cooking time for the food item disposed in the container. In some embodiments, the cooking device can transfer fluid from the second volume to the first volume to increase the amount of fluid in the first volume. In other embodiments, the cooking device can transfer fluid from one or more other thermal containers such as, for example, a thermal container (or portion thereof) containing a protein. In still other embodiments, the cooking device can transfer fluid from one or more fluid reservoirs or the like. Accordingly, the cooking device can be configured to selectively cook the food item(s) disposed in the thermal container at a predetermined and/or desired temperature for a predetermined and/or desired time. While the first volume of fluid is described above as being increased after a predetermined time, in other embodiments, the cooking device can be configured to increase the first volume in response to any suitable condition, signal, input, state, etc. For example, in some embodiments, the cooking device can be configured to increase the first volume of fluid in response to the first volume falling below or exceeding a volume threshold. In other embodiments, the cooking device can be configured to increase the first volume in response to a temperature of the first volume of fluid falling below or exceeding a temperature threshold. In still other embodiments, the cooking device can be configured to increase the first volume in response any suitable parameter or combination of parameters.

As described in detail above with reference to the carrier 200, in some embodiments, a cooking time and/or temperature can be at least partially based on data and/or information associated with the food item(s) disposed in the thermal container. For example, in some embodiments, the cooking device can receive and/or can retrieve data and/or information from a communication device (e.g., NFC, RFID, QR, etc.) included in a packaging of the food item(s), a user input at or into a user interface of the cooking device, one or more signals received from a remote electronic device (e.g., a computer, a smartphone, a tablet, a controller or the like in communication with the cooking device via, for example, the Internet of Things, etc.), and/or the like.

The method 10 includes draining the portion of the carrier in response to the first volume of fluid exceeding a threshold volume of fluid, at 15. For example, in some embodiments, the portion of the carrier can include and/or can be in fluid communication with a port, drain, and/or the like configured to selectively drain the first volume of fluid from the portion of the carrier. In some embodiments, the port and/or drain can be arranged as a siphon or the like configured to selectively drain the portion of the carrier in response to the first volume of fluid exceeding the threshold volume of fluid. More specifically, as described above with reference to FIGS. 4-6, the portion of the carrier can include and/or can be coupled to a drain tube with, for example, an inlet portion in fluid communication with the portion of the carrier and disposed at a first elevation, an inverted U-bend portion disposed at a second elevation higher than the first elevation, and an outlet portion in fluid communication with a drain volume of the cooking device and disposed at a third elevation lower than the first elevation.

Accordingly, during the cooking process, a portion of the first volume of fluid can be disposed in the port and/or drain. Prior to the increasing the first volume of fluid (e.g., during the cooking process), however, the first volume and/or a pressure associated with the first volume of fluid is insufficient to urge the fluid disposed in the port and/or drain to flow through and/or over the inverted U-bend and as such, the first volume of fluid is not drained from the portion of the carrier during the cooking process. In response to the increase in the first volume of fluid (and/or an increase in a pressure associated with the first volume), however, the fluid disposed in the port and/or drain is urged to flow through and/or over the inverted U-bend and through the outlet portion of the drain tube. Accordingly, the increase in the first volume is sufficient to initiate a flow of the fluid through the drain tube and once the flow is initiated, the addition of fluid into the portion of the container can be stopped. As described above, with the drain tube arranged as a siphon, a flow of fluid through the drain tube results in a pressure differential sufficient to urge substantially continuous and/or unaided fluid flow therethrough and as such, the portion of the carrier can be substantially drained of the first volume.

As described above, in some instances, the food items disposed in the container can be, for example, starches or the like, which can be disposed in a fluid permeable package or can be loose or unpackaged. The food items are at least partially submerged in the first volume of fluid transferred into the portion of the container and as such, the used fluid may contain contaminants, undesirable microbes, and/or food particles such as starches or the like, which may negatively impact the safe performance of portions of the food storage and cooking device. Thus, in some embodiments, the method 10 of cooking the food items is such that an inner volume of the portion of the carrier is fluidically isolated, which in turn, can isolate and/or separate the first volume of fluid disposed therein from, for example, the second volume of fluid and/or desired portions of the cooking device. Moreover, in some embodiments, draining the portion of the carrier via siphoning can allow for the portion of the carrier to be drained without the need for a pump, valves, and/or other fluid flow controllers, which may otherwise become contaminated, clogged, and/or the like.

In some embodiments, a user can, for example, subscribe to a meal delivery service in which the user selects the food items he or she wishes to eat (e.g., via a personal computer (PC) application, mobile application, web browser and the Internet, telephone service, etc.) and receives, via delivery, a cartridge such as those described herein containing the ordered food items. In this manner, the user can receive the food items and can place them within a storage and cooking device such as the device described in the '383 publication without having to place the food items, for example, in freeze storage or the like. In some embodiments, a user can place the food items (e.g., pre-packaged food items and/or loose or unpackaged food items) in a carrier such as the carriers 100 and/or 200 described herein, which is then inserted into a portion of the storage and cooking device. Such subscription services can be based on, for example, a desired number of meals per week and/or any other suitable measure. In other instances, a user can purchase one or more cartridges "on demand." For example, a user can enter an order via the Internet and a web browser, PC or mobile application, etc.

The food items received via such a meal service can be packaged and/or manufactured in any suitable manner. For example, in some embodiments, disposing the starch and/or vegetable in a fluid permeable pouch or the like can reduce manufacturing time and/or complexity otherwise resulting from handling a loose food items (e.g., rice). In some instances, disposing the starch and/or vegetable in a fluid permeable pouch or the like can simplify the removal of the cooked food from the carrier or cooking device. Alternatively or in addition, in some such embodiments, any of the food items can be pre-packaged and/or placed in, for example, a fluid impermeable pouch or the like (e.g., a sauce or the like can be disposed in a fluid impermeable pouch). In other embodiments, any of the food items or portions thereof can be loose, in bulk, and/or otherwise unpackaged.

Figure 8:
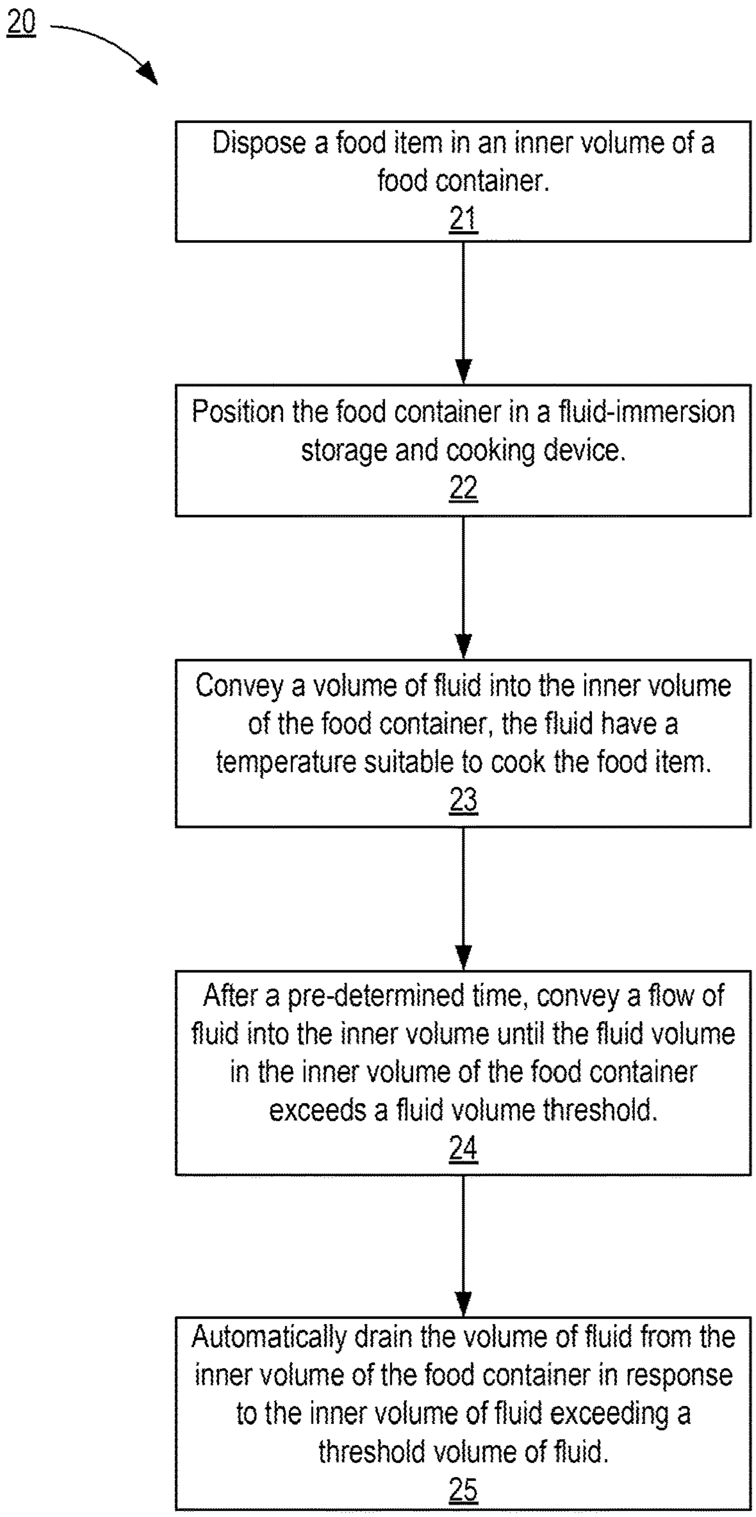
FIG. 8 is a flowchart illustrating a method for cooking a food item in a food storage and cooking device, according to an embodiment.

FIG. 8 is a flowchart illustrating a method 20 of cooking a food item via a food storage and cooking device according to an embodiment. The food storage and cooking device (also referred to herein as "cooking device") can be any suitable device such as those described in detail herein. In some embodiments, the cooking device can be substantially similar to and/or the same as those described in the '383 publication. In some embodiments, such a cooking device can be configured to circulate a volume of fluid through one or more thermal containers, each of which is configured to store and/or cook one or more food items. For example, in some instances, a volume of fluid contained in and/or flowing through at least a portion of the cooking device is cooled or chilled to a predetermined and/or desired storage temperature suitable for storing a food item (e.g., a first configuration). In response to a signal or a set of instructions, the cooking device can be transitioned to a second configuration in which the volume of fluid contained in and/or flowing through the portion of the cooking device is heated to a predetermined and/or desired cooking temperature suitable for cooking the food item.

As shown in FIG. 8, the method 20 includes disposing a food item into an inner volume of a food container, at 21. The food item can be any suitable food item(s) such as those described herein, and therefore the food item is not described in further detail herein. In some embodiments, the inner volume can be configured to contain the food item and a volume of a fluid. The food container can be any suitable shape, size, and/or configuration. For example, in some embodiments, the food container can be substantially similar to the second container 135 and/or 235 described in detail above. In some embodiments, the container is at least partially fluid permeable (e.g., can define one or more openings, can include and/or can be formed of a mesh material, and/or otherwise can allow for fluid flow into and out of the container).

As shown in FIG. 8, the method 20 includes positioning the food container in the food storage and cooking device, at 22. In some embodiments, the food container can be positioned in a thermal container or sufficiently nearby to the thermal container such that heat exchange is facilitated between the thermal container and the food container. In some embodiments, the food container can be positioned in one of a plurality of food carriers. The carrier can be any suitable carrier such as, for example, the carrier 100 and/or 200 described in detail herein. As such, the carrier can include one or more portions configured to receive one or more food items. For example, in some embodiments, the carrier can include a first portion configured to receive at least a first food item such as a vegetable and a second portion configured to receive at least a second food item such as a starch.

As shown in FIG. 8, the method 20 includes conveying a volume of fluid into the inner volume of the food container, the fluid having a temperature suitable to cook the food item, at 23. In some embodiments, the volume of fluid can be conveyed from a reservoir or from a tap. In some embodiments, the volume of fluid can be conveyed via a pipe, conduit, tube, channel, funnel, or combinations thereof. In some embodiments, the conveyance of the volume of fluid can be facilitated at least in part using a pumping mechanism configured to move fluids between a first location and a second location. In some embodiments, the pumping mechanism can be a hydraulic pump, a positive displacement pump, a rotary pump, a gravity pump, a displacement pump, a direct lift pump, a reciprocating pump, an impulse pump, a velocity pump, a centrifugal pump, an axial-flow pump, a screw pump, a flexible vane pump, a sliding vane pump, a piston pump, a plunger pump, a diaphragm pump, a peristaltic pump, a rotary lobe pump, a progressive cavity pump, other suitable pumping mechanisms, or combinations thereof. In some embodiments, the conveyance of the volume of fluid can be controlled using at least one of a flow limiting device, a flow meter, a valve, a flow gate, other suitable mechanisms, and combinations thereof. In some embodiments, the volume of fluid can be conveyed past a heating element to heat the volume of fluid before the conveying into the inner volume of the food container. In some embodiments, the volume of fluid can be conveyed past a cooling element to cool the volume of fluid before the conveying into the inner volume of the food container.

As shown in FIG. 8, the method 20 includes conveying a flow of fluid, after a predetermined time, into the inner volume of the food container until the fluid volume in the inner volume of the food container exceeds a fluid volume threshold, at 24. In some embodiments, the predetermined time is a predetermined cooking time associated with the food item. In some embodiments, conveying the volume of fluid into the inner volume of the food container 23 transfers thermal energy to the food item such that the food item achieves a temperature threshold. In some embodiments, the temperature achieved by the food item is a predetermined cooking temperature associated with the food item.

As shown in FIG. 8, the method 20 includes automatically draining the volume of fluid from the inner volume of the food container in response to the inner volume of fluid exceeding the fluid volume threshold, at 25. In some embodiments, automatically draining the volume of fluid from the inner volume of the food container 24 includes syphoning the volume of fluid from the inner volume of the food container. In some embodiments, the outlet of the food container is coupled to a drain line. In some embodiments, the threshold volume of fluid within the food container is associated with a first height relative to the food container, a portion of the drain line being disposed in a position associated with a second height relative to the food container, the second height being greater than the first height. In some embodiments, the portion of the drain line forms an inverted U-shaped bend. In some embodiments, automatic draining can include the use of a pumping device as described herein, can include a gravity drain, can include displacement draining where incoming fluid displaces waste fluid in the inner volume of the food container, and/or the like. In some embodiments, a peristaltic pump can be fluidically coupled to the drain such that a partial vacuum is formed when the peristaltic pump is engaged, which can cause the draining of the volume of fluid from the inner volume of the food container before any subsequent flow of fluid is conveyed into the inner volume of the food container.

Figure 9:
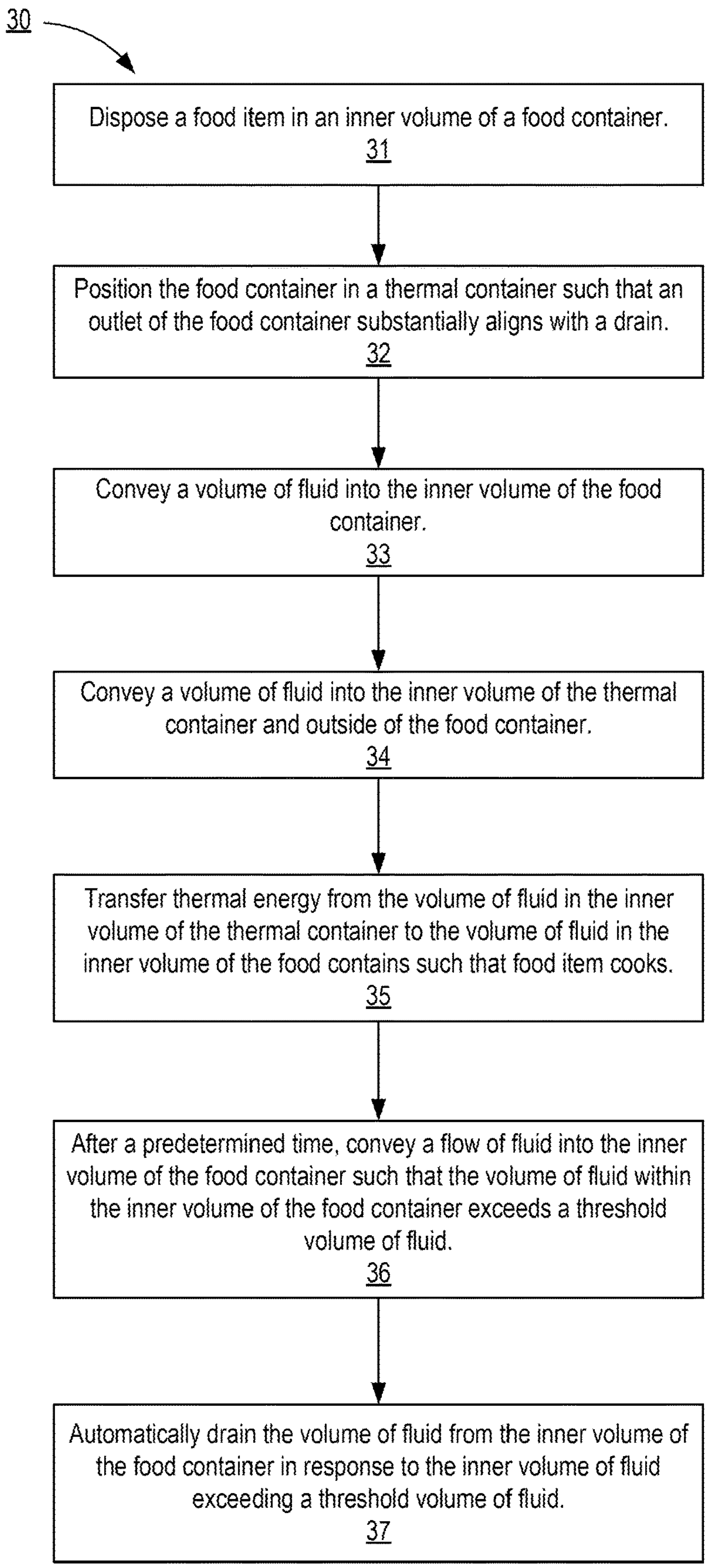
FIG. 9 is a flowchart illustrating a method for cooking a food item in a food storage and cooking device, according to an embodiment.

FIG. 9 is a flowchart illustrating a method 30 of cooking a food item via a food storage and cooking device according to an embodiment. The food storage and cooking device (also referred to herein as "cooking device") can be any suitable device such as those described in detail herein. In some embodiments, the cooking device can be substantially similar to and/or the same as those described in the '383 publication. In some embodiments, such a cooking device can be configured to circulate a volume of fluid through one or more thermal containers, each of which is configured to store and/or cook one or more food items. For example, in some instances, a volume of fluid contained in and/or flowing through at least a portion of the cooking device is cooled or chilled to a predetermined and/or desired storage temperature suitable for storing a food item (e.g., a first configuration). In response to a signal or a set of instructions, the cooking device can be transitioned to a second configuration in which the volume of fluid contained in and/or flowing through the portion of the cooking device is heated to a predetermined and/or desired cooking temperature suitable for cooking the food item.

As shown in FIG. 9, the method 30 includes disposing a food item into an inner volume of a food container, at 31. The food item can be any suitable food item(s) such as those described herein, and therefore the food item is not described in further detail herein. In some embodiments, the inner volume can be configured to contain the food item and a volume of a fluid. In some embodiments, the food container includes a set of walls defining the inner volume of the food container, the transferring of thermal energy from the volume of the fluid in the inner volume of the thermal container to the inner volume of the food container includes transferring thermal energy through the set of walls. The food container can be any suitable shape, size, and/or configuration. For example, in some embodiments, the food container can be substantially similar to the second container 135 and/or 235 described in detail above. In some embodiments, the container is at least partially fluid permeable (e.g., can define one or more openings, can include and/or can be formed of a mesh material, and/or otherwise can allow for fluid flow into and out of the container).

As shown in FIG. 9, the method 30 includes positioning the food container in a thermal container such that an outlet of the food container is substantially aligned with a drain of the food storage and cooking device, at 32. In some embodiments, the food container can be positioned in a thermal container or sufficiently nearby to the thermal container such that heat exchange is facilitated between the thermal container and the food container. In some embodiments, the food container can be positioned in one of a plurality of food carriers. The carrier can be any suitable carrier such as, for example, the carrier 100 and/or 200 described in detail herein. As such, the carrier can include one or more portions configured to receive one or more food items. For example, in some embodiments, the carrier can include a first portion configured to receive at least a first food item such as a vegetable and a second portion configured to receive at least a second food item such as a starch.

As shown in FIG. 9, the method 30 includes conveying a volume of fluid into the inner volume of the food container, at 33. In some embodiments, the volume of fluid can be conveyed from a reservoir or from a tap. In some embodiments, the volume of fluid can be conveyed via a pipe, conduit, tube, channel, funnel, or combinations thereof. In some embodiments, the conveyance of the volume of fluid can be facilitated at least in part using a pumping mechanism configured to move fluids between a first location and a second location. In some embodiments, the pumping mechanism can be a hydraulic pump, a positive displacement pump, a rotary pump, a gravity pump, a displacement pump, a direct lift pump, a reciprocating pump, an impulse pump, a velocity pump, a centrifugal pump, an axial-flow pump, a screw pump, a flexible vane pump, a sliding vane pump, a piston pump, a plunger pump, a diaphragm pump, a peristaltic pump, a rotary lobe pump, a progressive cavity pump, other suitable pumping mechanisms, or combinations thereof. In some embodiments, the conveyance of the volume of fluid can be controlled using at least one of a flow limiting device, a flow meter, a valve, a flow gate, other suitable mechanisms, and combinations thereof. In some embodiments, the volume of fluid can be conveyed past a heating element to heat the volume of fluid before the conveying into the inner volume of the food container. In some embodiments, the volume of fluid can be conveyed past a cooling element to cool the volume of fluid before the conveying into the inner volume of the food container.

As shown in FIG. 9, the method 30 includes conveying a volume of fluid into the inner volume of the thermal container and outside of the food container, at 34. In some embodiments, the volume of fluid can be conveyed from a reservoir or from a tap. In some embodiments, the volume of fluid can be conveyed via a pipe, conduit, tube, channel, funnel, or combinations thereof. In some embodiments, the conveyance of the volume of fluid can be facilitated at least in part using a pumping mechanism configured to move fluids between a first location and a second location. In some embodiments, the pumping mechanism can be a hydraulic pump, a positive displacement pump, a rotary pump, a gravity pump, a displacement pump, a direct lift pump, a reciprocating pump, an impulse pump, a velocity pump, a centrifugal pump, an axial-flow pump, a screw pump, a flexible vane pump, a sliding vane pump, a piston pump, a plunger pump, a diaphragm pump, a peristaltic pump, a rotary lobe pump, a progressive cavity pump, other suitable pumping mechanisms, or combinations thereof. In some embodiments, the conveyance of the volume of fluid can be controlled using at least one of a flow limiting device, a flow meter, a valve, a flow gate, other suitable mechanisms, and combinations thereof. In some embodiments, the volume of fluid can be conveyed past a heating element to heat the volume of fluid before the conveying into the inner volume of the food container. In some embodiments, the volume of fluid can be conveyed past a cooling element to cool the volume of fluid before the conveying into the inner volume of the food container.

As shown in FIG. 9, the method 30 includes transferring thermal energy from the volume of fluid in the inner volume of the thermal container to the volume of fluid in the inner volume of the food container such that food item cooks, at 35. In some embodiments, transferring thermal energy from the volume of fluid in the inner volume of the thermal container to the volume of fluid in the inner volume of the food container 35 results in the food item achieving a temperature threshold. In some embodiments, the temperature threshold of the food item is a predetermined cooking temperature associated with the food item.

As shown in FIG. 9, the method 30 includes conveying a flow of fluid, after a predetermined time, into the inner volume of the food container until the fluid volume in the inner volume of the food container exceeds a fluid volume threshold, at 36. In some embodiments, the predetermined time is a predetermined cooking time associated with the food item. In some embodiments, conveying the volume of fluid into the inner volume of the food container 36 transfers thermal energy to the food item such that the food item achieves a temperature threshold. In some embodiments, the temperature achieved by the food item is a predetermined cooking temperature associated with the food item.

As shown in FIG. 9, the method 30 includes automatically draining the volume of fluid from the inner volume of the food container in response to the inner volume of fluid exceeding a threshold volume of fluid, at 37. In some embodiments, automatically draining the volume of fluid from the inner volume of the food container 37 includes draining the volume of fluid from the inner volume of the food container without draining the volume of fluid from the inner volume of the thermal container. In some embodiments, the outlet of the food container is coupled to a drain line. In some embodiments, the threshold volume of fluid in the inner volume of the food container is a volume sufficient to initiate a syphoning of the volume of fluid from the inner volume of the food container.

In some embodiments, the method 30 can optionally include draining the volume of fluid from the inner volume of the thermal container independent of the draining of the volume of fluid from the inner volume of the food container. In some embodiments, draining can be carried out automatically. In some embodiments, automatically draining the volume of fluid from the inner volume of the food container 24 includes syphoning the volume of fluid from the inner volume of the food container. In some embodiments, the outlet of the food container is coupled to a drain line. In some embodiments, the threshold volume of fluid within the food container is associated with a first height relative to the food container, a portion of the drain line being disposed in a position associated with a second height relative to the food container, the second height being greater than the first height. In some embodiments, the portion of the drain line forms an inverted U-shaped bend. In some embodiments, automatic draining can include the use of a pumping device as described herein, can include a gravity drain, can include displacement draining where incoming fluid displaces waste fluid in the inner volume of the food container, and/or the like. In some embodiments, a peristaltic pump can be fluidically coupled to the drain such that a partial vacuum is formed when the peristaltic pump is engaged, which can cause the draining of the volume of fluid from the inner volume of the food container before any subsequent flow of fluid is conveyed into the inner volume of the food container.

Figure 10:
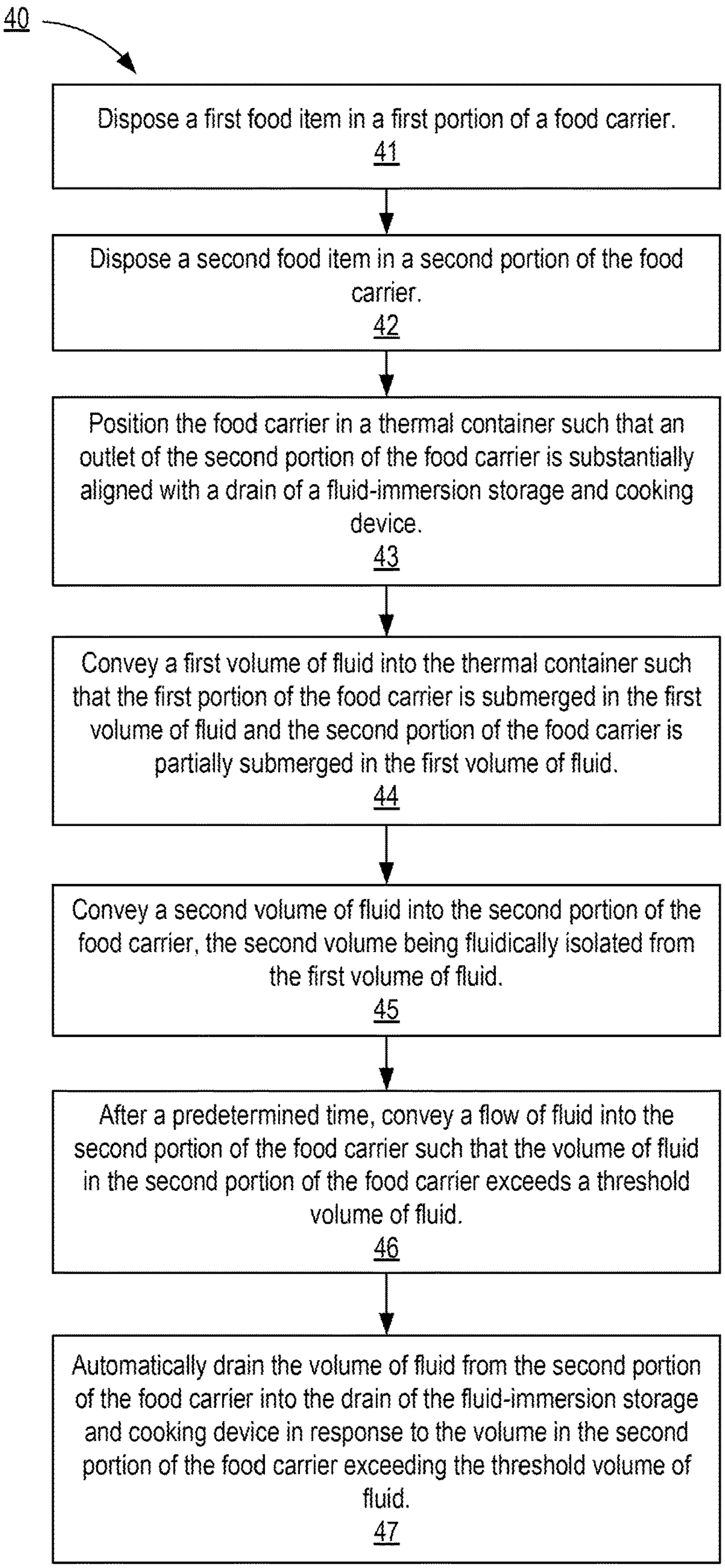
FIG. 10 is a flowchart illustrating a method for cooking a food item in a food storage and cooking device, according to an embodiment.

FIG. 10 is a flowchart illustrating a method 40 of cooking a food item via a food storage and cooking device according to an embodiment. The food storage and cooking device (also referred to herein as "cooking device") can be any suitable device such as those described in detail herein. In some embodiments, the cooking device can be substantially similar to and/or the same as those described in the '383 publication. In some embodiments, such a cooking device can be configured to circulate a volume of fluid through one or more thermal containers, each of which is configured to store and/or cook one or more food items. For example, in some instances, a volume of fluid contained in and/or flowing through at least a portion of the cooking device is cooled or chilled to a predetermined and/or desired storage temperature suitable for storing a food item (e.g., a first configuration). In response to a signal or a set of instructions, the cooking device can be transitioned to a second configuration in which the volume of fluid contained in and/or flowing through the portion of the cooking device is heated to a predetermined and/or desired cooking temperature suitable for cooking the food item.

As shown in FIG. 10, the method 40 includes disposing a first food item into a first portion of a food container, at 41 and disposing a second food item into a second portion of the food container, at 42. The food item can be any suitable food item(s) such as those described herein, and therefore the food item is not described in further detail herein. In some embodiments, the inner volume can be configured to contain the food item and a volume of a fluid.

As shown in FIG. 10, the method 40 includes positioning the food carrier in a thermal container such that an outlet of the second portion of the food carrier is substantially aligned with a drain of a food storage and cooking device, at 43. In some embodiments, the food carrier can be positioned in a thermal container or sufficiently nearby to the thermal container such that heat exchange is facilitated between the thermal container and the food carrier. In some embodiments, the food carrier can be positioned in one of a plurality of thermal containers. The food carrier can be any suitable carrier such as, for example, the carrier 100 and/or 200 described in detail herein. As such, the food carrier can include one or more portions configured to receive one or more food items. For example, in some embodiments, the food carrier can include a first portion configured to receive at least a first food item such as a vegetable and a second portion configured to receive at least a second food item such as a starch.

As shown in FIG. 10, the method 40 includes conveying a first volume of fluid into the thermal carrier such that the first portion of the food carrier is submerged in the first volume of fluid and the second portion of the food carrier is partially submerged in the first volume of fluid, at 44. In some embodiments, the first volume of fluid can be conveyed from a reservoir, from a tap, and/or from the like. In some embodiments, the first volume of fluid can be conveyed via a pipe, conduit, tube, channel, funnel, or combinations thereof. In some embodiments, the conveyance of the first volume of fluid can be facilitated at least in part using a pumping mechanism configured to move fluids between a first location and a second location. In some embodiments, the pumping mechanism can be a hydraulic pump, a positive displacement pump, a rotary pump, a gravity pump, a displacement pump, a direct lift pump, a reciprocating pump, an impulse pump, a velocity pump, a centrifugal pump, an axial-flow pump, a screw pump, a flexible vane pump, a sliding vane pump, a piston pump, a plunger pump, a diaphragm pump, a peristaltic pump, a rotary lobe pump, a progressive cavity pump, other suitable pumping mechanisms, or combinations thereof. In some embodiments, the conveyance of the first volume of fluid can be controlled using at least one of a flow limiting device, a flow meter, a valve, a flow gate, other suitable mechanisms, and combinations thereof. In some embodiments, the first volume of fluid can be conveyed past a heating element to heat the volume of fluid before the conveying into the thermal carrier. In some embodiments, the first volume of fluid can be conveyed past a cooling element to cool the volume of fluid before the conveying into the thermal carrier.

As shown in FIG. 10, the method 40 includes conveying a second volume of fluid into the second portion of the food carrier, the second volume being fluidically isolated from the first volume of fluid, at 45. In some embodiments, the first volume of fluid can be conveyed from a reservoir, from a tap, and/or from the like. In some embodiments, the first volume of fluid can be conveyed via a pipe, conduit, tube, channel, funnel, or combinations thereof. In some embodiments, the conveyance of the first volume of fluid can be facilitated at least in part using a pumping mechanism configured to move fluids between a first location and a second location. In some embodiments, the pumping mechanism can be a hydraulic pump, a positive displacement pump, a rotary pump, a gravity pump, a displacement pump, a direct lift pump, a reciprocating pump, an impulse pump, a velocity pump, a centrifugal pump, an axial-flow pump, a screw pump, a flexible vane pump, a sliding vane pump, a piston pump, a plunger pump, a diaphragm pump, a peristaltic pump, a rotary lobe pump, a progressive cavity pump, other suitable pumping mechanisms, or combinations thereof. In some embodiments, the conveyance of the first volume of fluid can be controlled using at least one of a flow limiting device, a flow meter, a valve, a flow gate, other suitable mechanisms, and combinations thereof. In some embodiments, the first volume of fluid can be conveyed past a heating element to heat the volume of fluid before the conveying into the thermal carrier. In some embodiments, the first volume of fluid can be conveyed past a cooling element to cool the volume of fluid before the conveying into the thermal carrier.

As shown in FIG. 10, the method 40 includes conveying a flow of fluid, after a predetermined time, into the second portion of the food carrier such that the volume of fluid in the second portion of the food carrier exceeds a threshold volume of fluid, at 46. In some embodiments, the predetermined time is a predetermined cooking time associated with the second food item. In some embodiments, conveying the volume of fluid into the inner volume of the food container 46 transfers thermal energy to the food item such that the food item achieves a temperature threshold. In some embodiments, the temperature achieved by the food item is a predetermined cooking temperature associated with the food item.

As shown in FIG. 10, the method 40 includes automatically draining the volume of fluid from the second portion of the food carrier into the drain of the food storage and cooking device in response to the volume in the second portion of the food carrier exceeding the threshold volume of fluid, at 47. In some embodiments, automatically draining the volume of fluid from the second portion of the food carrier includes syphoning the volume of fluid from the second portion of the food carrier. In some embodiments, automatically draining the volume of fluid from the second portion of the food carrier includes draining the volume of fluid from the second portion of the food carrier without draining the first volume of fluid from the thermal container.

In some embodiments, the method 40 can optionally include heating the second volume of fluid to a predetermined temperature prior to conveying the second volume of fluid into the second portion of the food carrier, the predetermined temperature being a predetermined cooking temperature associated with the second food item. In some embodiments, the method 40 can optionally include transferring thermal energy from the first volume of fluid to the second volume of fluid. In some embodiments, the method 40 can optionally include automatically draining the first volume of fluid from the thermal container into the drain of the food storage and cooking device after draining the volume of fluid from the second portion of the food carrier. In some embodiments, the first volume of fluid from the thermal container can be drained into the second portion of the food carrier and from the second portion of the food container into the drain of the food storage and cooking device after the volume of fluid from the second portion of the food carrier has been drained. In some embodiments, the draining of the first volume of fluid from the thermal container into the second portion of the food carrier can be carried out at the same time as the volume of fluid is drained from the second portion of the food carrier into the drain of the food storage and cooking device.

Figure 11:
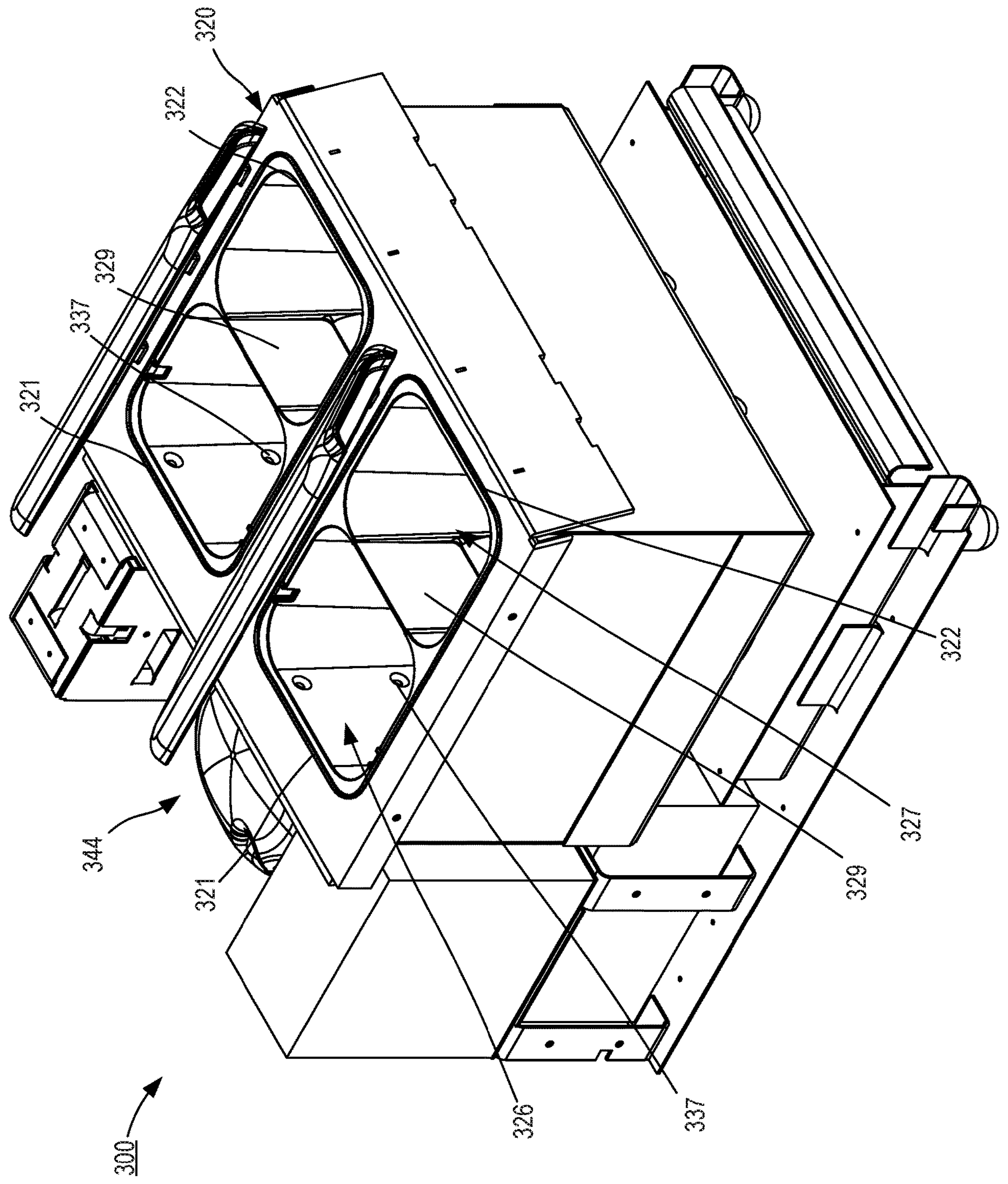
FIG. 11 is a perspective view of at least a portion of a semi-autonomous food storage and cooking device according to an embodiment.

Each of the methods 10, 20, 30, and 40 described above can be performed using a food storage and cooking device that can transition from a first configuration in which a volume of fluid contained in and/or flowing through at least a portion of the device is cooled or chilled to a predetermined and/or desired storage temperature suitable for storing a food item to a second configuration in which the volume of fluid contained in and/or flowing through the portion of the cooking device is heated to a predetermined and/or desired cooking temperature suitable for cooking the food item. An example of using a food storage and cooking device in such a first configuration is described below with reference to FIG. 11, which shows a perspective view of at least a portion of a food storage and cooking device 300 described in detail in the '383 publication and incorporated by reference above.

In some instances, a user can dispose a food cartridge and/or a portion of a food cartridge within the first volume 326 defined by the first portion 321 of the thermal container 320. In some instances, for example, the food cartridge disposed within the first volume 326 can contain a meat and/or protein. Similarly, the user can dispose one or more food cartridges or one or more portions of a food cartridge in the second volume 327. In some embodiments, the arrangement of the second portion 322 and the one or more food cartridges can be such that the food cartridge(s) are disposed in the second volume 327 in a predetermined orientation. In some embodiments, the food cartridge(s) can be disposed within a holder or caddy configured to at least temporarily retain the food cartridge(s) in a predetermined orientation and/or arrangement.

With the food items disposed within the first volume 326 and/or the second volume 327, a controller (not shown in FIG. 11) can execute one or more processes to place the device 300 in the storage configuration or the cooking configuration based on a user input. If the time at which the user would like the food to be ready is such that the device 300 should store the food items contained therein for a period of time, then the controller can, for example, place the device 300 in the storage configuration. As such, the controller can perform one or more processes operable to control, for example, at least a portion of the fluid circulation system (described in detail in the '383 publication) such that a cooled and/or cold fluid is conveyed into and/or circulated through the first volume 326 of the thermal container 320. Specifically, after disposing the food cartridge(s) in the thermal container 320, the user can convey a volume of fluid (e.g., water) into the first volume 326 defined by the first portion 321 of the thermal container 320. The fluid can be any suitable temperature, which can be determined via a thermal sensor in fluid communication with the first volume 326 via the sensor portion. Thus, as described in detail above, the controller can perform one or more processes operable in circulating the volume of fluid through, for example, the "cold loop" of the fluid circulation system. That is to say, a pump can convey the volume of fluid through the heat exchanger 344 in which the working fluid of a chiller assembly (not shown in FIG. 11) removes thermal energy from the fluid such that the fluid is cooled. The cooled and/or cold fluid can then flow from the heat exchanger 344 and through the inlet port 337 of the first portion 321 and into the first volume 326. In this manner, the fluid circulation system can be configured to circulate the fluid to maintain the fluid at or below a predetermined and/or desired storage temperature (e.g., about 40° F.). Moreover, the cooled and/or cold fluid circulating through the first volume 326 results in a temperature of the food item (e.g., a meat or protein) contained in the first volume 326 being reduced to and/or maintained substantially at the predetermined and/or desired storage temperature (e.g., the temperature of the food item is brought into and/or maintained at substantial equilibrium with the temperature of the fluid circulating through the first volume 326.

The arrangement of the device 300 when in the storage configuration is such that the fluid is only circulated through the first volume 326. That is to say, the fluid circulation system does not convey fluid into and/or circulate fluid through the second volume 327 when the device 300 is in the storage configuration. As described in detail in the '383 publication, a wall 329 disposed within the thermal container 320 is configured to transfer thermal energy from the second volume 327 to the fluid circulating through the first volume 326. For example, the wall 329 can be formed of a thermally conductive material and as such, thermal energy from the second volume 327 is conveyed through the wall 329 and absorbed by the cooled and/or cold fluid circulating through the first volume 326. In some embodiments, such an arrangement results in a relatively dry storage of the food items within the second volume 327 substantially at the predetermined and/or desired storage temperature. In some instances, the relatively dry storage substantially at the storage temperature is suitable for the food items contained therein (e.g., starch, vegetables, carbohydrates, etc.). At a predetermined, calculated, and/or desired time, the controller can be configured to perform one or more processes to transition the device 300 from the storage configuration to the cooking configuration, as described in detail above.

While various embodiments have been described above, it should be understood that they have been presented by way of example only, and not limitation. Where schematics and/or embodiments described above indicate certain components arranged in certain orientations, positions, and/or configurations, the arrangement of components may be modified. Although various embodiments have been described as having particular features and/or combinations of components, other embodiments are possible having a combination(s) of any features and/or components from any of embodiments as discussed above.

While the embodiments have been particularly shown and described, it will be understood that various changes in form and details may be made. For example, while the carrier 200 is described above as including the first portion 210 configured to receive a sauce, seasoning, and/or vegetable and a second portion 220 configured to receive a starch, in other embodiments, a carrier can have any suitable number of portions configured to receive any suitable food item. For example, in some embodiments, a carrier can include a single portion configured to contain one of a meat, sauce, seasoning, starch, or vegetable. In other embodiments, a carrier can include a single food compartment configured to contain an entire meal including a meat, starch, and vegetable (and any suitable sauce and/or seasoning).

While the carriers 100 and/or 200 are described herein as being configured to receive food items such as, for example, sauces, seasonings, starches, and/or vegetables, it should be understood that these food items are presented by way of example only and not limitation. In other words, the embodiments described herein can receive any suitable food item disposed in a package or unpackaged. In some embodiments, a carrier can receive, for example, a sauce, seasoning, starch, and/or vegetable and can be disposed in a first portion of a thermal container. Although not shown herein, an additional food item such as a protein (e.g., meat) can be positioned within, for example, a second portion of the thermal container. In such embodiments, the protein can be pre-packaged or can be unpackaged. In some embodiments, the protein can be disposed in a carrier or the like, which in turn, is disposed in the second portion of the thermal container. In other embodiments, the sauce, seasoning, starch, and/or vegetable can be disposed in a first part of a carrier and the protein can be disposed in a second part of the carrier distinct from the first part. In such embodiments, the first part of the carrier can be disposed in the first portion of the thermal container and the second part of the carrier can be disposed in the second portion of the thermal container.

While the embodiments have been described herein as being formed of a given material(s), in other embodiments, any of the embodiments and/or portions thereof can be formed from any suitable material or combination of materials and/or formed via any suitable manufacturing process. For example, in some embodiments, one or more portions of a carrier such as those described above can be formed of a plastic or the like via injection molding or the like. In some embodiments, a carrier and/or at least a portion of the carrier can be disposable after cooking the food items positioned therein. In other embodiments, at least a portion of a carrier can be formed from any suitable material and configured for reuse. For example, in some embodiments, a carrier or a portion of a carrier (e.g., the carriers 100 and/or 200) can be formed of a reusable material such as metal or plastic that can be cleaned after cooking food items positioned therein (e.g., via the dishwasher or the like) and reused. In such embodiments, after cleaning the carrier, uncooked food items (e.g., packaged or loose) can be inserted into the carrier, which can then be positioned in the thermal container of the cooking device. Thus, such carriers can be "reloaded" and/or otherwise at least partially reusable.

While the carriers are described above as being configured to transfer thermal energy from, for example, a volume of fluid disposed in a thermal container of a cooking device to a volume of fluid defined by a portion of the carrier (e.g., the double boil or double heating arrangement described above), in other embodiments, any of the carriers described herein can be configured to transfer thermal energy from any suitable source to the volume of fluid contained in and/or defined by the portion of the carrier. For example, in some embodiments, a carrier and/or a portion of the carrier can include a heating element or the like configured to heat a portion of the carrier to increase an amount of thermal energy of the volume of fluid. In other embodiments, a portion of the carrier can be heated via electric and/or electromagnetic energy (e.g., induction). As such, electric current and/or electromagnetic energy can be passed through a portion of the carrier, which in turn, results in a heating of the portion of the carrier due to a resistance of the constituent material (e.g., electrical resistance that resists the flow of electrical current). In still other embodiments, thermal energy can be transferred to the volume of fluid contained in and/or defined by the portion of the carrier from any suitable thermal energy source or combination of sources.

Where methods and/or schematics described above indicate certain events and/or flow patterns occurring in certain order, the ordering of certain events and/or flow patterns may be modified. Additionally certain events may be performed concurrently in parallel processes when possible, as well as performed sequentially. For example, in some instances, the arrangement of a carrier such as the carrier 200 and a cooking device can be such that the food items contained in the first portion 210 of the carrier 200 are cooked prior to and/or independent of the food items in the second portion 220 of the carrier 200. In other instances, the food items contained in the first food portion 210 of the carrier 200 can be cooked in an at least partially concurrent process with the food items contained in the second portion 220 of the carrier 200.

What is claimed:

1. A method of using a food storage and cooking device, the food storage and cooking device including a first thermal container and a second thermal container, the first thermal container and the second thermal container configured to store and cook food therein, the method comprising:

disposing a food item in an inner volume of a food container;

positioning the food container, with the food item disposed in the inner volume thereof, in the first thermal container of the food storage and cooking device such that the inner volume of the food container can receive a flow of fluid from the food storage and cooking device and a drain line coupled to an open outlet of the food container is separated from but substantially aligned with a drain of the food storage and cooking device;

transferring thermal energy from the food item disposed in the first thermal container to fluid circulating through the second thermal container, the fluid circulating through the second thermal container being cooled to a storage temperature;

conveying, via the food storage and cooking device, a first volume of fluid into the first thermal container and in contact with an outer surface of the food container;

conveying, via the food storage and cooking device, a second volume of fluid into the inner volume of the food container;

transferring thermal energy, via the food container, from the first volume of fluid to the second volume of fluid to maintain the second volume of fluid at a desired temperature to cook the food item disposed in the inner volume of the food container, wherein the open outlet of the food container is configured such that a portion of the second volume of fluid is disposed in a portion of the drain line while the food item is being cooked, and the second volume of fluid being sufficient to submerge the food item but insufficient to initiate a flow of the fluid through the drain line and into the drain of the food storage and cooking device;

conveying, after a predetermined time and via the food storage and cooking device, a flow of fluid into the inner volume of the food container such that a third volume of fluid within the inner volume of the food container exceeds a threshold volume of fluid, the threshold volume of fluid being a volume sufficient to initiate the flow of the fluid through the drain line; and automatically draining the third volume of fluid from the inner volume of the food container, through the drain line, and into the drain of the food storage and cooking device in response to the third volume of fluid within the inner volume of the food container exceeding the threshold volume of fluid, wherein the threshold volume of fluid within the food container is such that a surface of the fluid in the inner volume of the food container is at a first height relative to the food container, a portion of the drain line being disposed in a position associated with a second height relative to the food container, the second height being greater than the first height, wherein the third volume of fluid exceeding the threshold volume of fluid initiates a syphoning of the inner volume of the food container to drain the third volume of fluid via the drain line without the use of a valve.

2. The method of claim 1, wherein the outlet of the food container is removably coupled to the drain line.

3. The method of claim 1, wherein the portion of the drain line forms an inverted U-shaped bend.

4. The method of claim 1, wherein the predetermined time is a predetermined cooking time associated with the food item.

5. The method of claim 1, wherein the temperature is a predetermined cooking temperature associated with the food item.

6. The method of claim 1, wherein the second volume of fluid is heated directly using a heating element such that the temperature of the second volume of fluid is sufficient to cook the food item disposed in the inner volume of the food container.

* * * * *